United States Patent
Hassan et al.

(10) Patent No.: US 10,860,840 B2
(45) Date of Patent: Dec. 8, 2020

(54) FACE RECOGNITION IN NOISY ENVIRONMENTS

(71) Applicant: Microsoft Technology Licensing, LLC, Redmond, WA (US)

(72) Inventors: Amer A. Hassan, Kirkland, WA (US); Edward C. Giaimo, III, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 16/191,057

(22) Filed: Nov. 14, 2018

(65) Prior Publication Data
US 2020/0151430 A1 May 14, 2020

(51) Int. Cl.
*G06K 9/00* (2006.01)
*G06F 16/58* (2019.01)
*G06F 21/32* (2013.01)
*G06T 7/40* (2017.01)

(52) U.S. Cl.
CPC .......... *G06K 9/00288* (2013.01); *G06F 16/58* (2019.01); *G06F 21/32* (2013.01); *G06T 7/40* (2013.01)

(58) Field of Classification Search
None
See application file for complete search history.

(56) References Cited

U.S. PATENT DOCUMENTS

| | | | |
|---|---|---|---|
| 2012/0257797 A1* | 10/2012 | Leyvand | A63F 13/40 382/118 |
| 2013/0216108 A1* | 8/2013 | Hwang | G06K 9/00926 382/118 |
| 2017/0063852 A1* | 3/2017 | Azar | G06F 21/36 |

OTHER PUBLICATIONS

"International Search Report and Written Opinion Issued in PCT Application No. PCT/US2019/060163", dated Feb. 25, 2020, 11 Pages.

* cited by examiner

*Primary Examiner* — Delomia L Gilliard
(74) *Attorney, Agent, or Firm* — Schwegman Lundberg & Woessner, P.A.

(57) ABSTRACT

A computing device stores an acquired image as a transient image template when there is a failure in an image-based authentication of the acquired image and the user of the computing device has provided user credentials that authorize the user to access the computing device. The transient image template may be used to further authorize the user to access the computing device during a predetermined time period. At the expiration of the predetermined time period, the computing device deletes the transient image template. The computing device then reverts to using a baseline image template for performing image-based authentication of the user. The transient image template may also be associated with a location such that the computing device uses the transient image template for image-based authentication when the computing device is at or near the location.

20 Claims, 14 Drawing Sheets

FACE RECOGNITION IN NOISY ENVIRONMENTS

TECHNICAL FIELD

The subject matter disclosed herein generally relates to an image-based authentication mechanism and, in particular, to using a transient image template for performing image-based authentication for use in situations such as those posed by adverse lighting conditions.

BACKGROUND

A computing device typically employs one or more mechanisms for authenticating a user to use the computing device. Examples of such mechanisms include a Personal Identification Number (e.g., a PIN), an alphanumeric password, a biometric input (e.g., voice, fingerprint, etc.), and image recognition. Image recognition is often used over an alphanumeric password or PIN because the user is not required to memorize the alphanumeric password or PIN and can simply have the computing device capture an image of him or her to access the computing device. Image recognition also provides a hands-free and voice-free method by which a user may authenticate himself or herself to the computing device. Images recognized may include a face, iris, cornea, or other body part.

In general, the computing device uses a baseline image template for performing the image recognition. The computing device may use one or more image processing techniques to compare the baseline image template with a captured image of the user attempting to authenticate himself or herself with the computing device. Where the computing device determines that the captured image is similar to the baseline image template, the computing device may then authorize the user to access the computing device.

However, under some conditions, the computing device may determine that the captured image is not similar to the baseline image template, even where the user is, in fact, authorized to access the computing device. As one example, varying lighting conditions may affect the captured image such that the computing device has difficulty determining whether the captured image is similar to the baseline image template. Further still, the varying lighting conditions may persist such that the image recognition mechanism becomes a less accurate or less useful means by which to authenticate the user.

SUMMARY

To address these and other problems that arise within the field of image-based authentication, this disclosure provides for one or more embodiments of a computing device that establishes a temporary or transient image template for use in authenticating a user when the computing device is unable to authenticate a user using a captured image.

In one embodiment, a disclosed system includes a computer-readable storage device having computer-executable instructions stored thereon, and one or more hardware processors communicatively coupled to the computer-readable storage device. When the computer-executable instructions are executed the one or more hardware processors configure the system to acquire a first image with a computing device and compare the first image with a first image template to determine whether a person corresponding to the first image is authorized to use the computing device. The one or more hardware processors also configure the system to display a request for user credentials to authenticate the user based on the comparison of the first image and the first image template and receive the user credentials. The one or more hardware processors further configure the system to store the first image as a second image template based on a determination that the user credentials authorizes the user to use the computing device, wherein the second image template is used for authorizing the user rather than the first image template based on a predetermined condition and acquire a second image with the computing device. In addition, the one or more hardware processors configure the system to compare the second image with the second image template to determine whether the user is authorized to use the computing device based on the predetermined condition, and grant access to the computing device based on the comparison of the second image and the second image template.

In another embodiment of the system, the system is further configured to evaluate the predetermined condition, delete the second image template in response to the evaluation of the predetermined condition, and designate the first image template for use in authorizing the user after deleting the second image template.

In a further embodiment of the system, the evaluation of the predetermined condition is performed by establishing a timer that indicates a duration of time that the second image template is to be used to authenticate the user, and determining whether the tinier has expired, wherein the deletion of the second image template is in response to a determination that the timer has expired.

In yet another embodiment of the system, the system is further configured to associate a location with the second image template, and the evaluation of the predetermined condition comprises determining whether the computing device is at a predetermined distance to the location associated with the second image template and deleting the second image template comprises deleting the second image template in response to a determination that the computing device exceeds the predetermined distance to the location.

In yet a further embodiment of the system, the location is associated with the second image template in response to the user being authenticated by the user credentials.

In another embodiment of the system, the system is further configured to determine an ambient light level associated with the first image, and the storage of the first image as the second image template comprises comparing the ambient light level with an ambient light level threshold, and storing the first image as the second image template in response to a determination that the ambient light level exceeds the ambient light level threshold.

In a further embodiment of the system, the comparison of the first image with the first image template results in an image-based authentication failure, and the user credentials authorize the user after the image-based authentication failure. In addition, the system is further configured to increment a failure count value in response to the image-based authentication failure, determine whether the failure count value exceeds a failure count threshold value, and replace the first image template with the second image template such that the first image template is no longer used for image-based authentication.

This disclosure further provides for a method for accessing a computer device, the method comprising acquiring a first image with a computing device, comparing the first image with a first image template to determine whether a person corresponding to the first image is authorized to use the computing device, and displaying a request for user credentials to authenticate the user based on the comparison of the first image and the first image template. The method also includes receiving the user credentials, storing the first image as a second image template based on a determination that the user credentials authorizes the user to use the computing device, wherein the second image template is used for authorizing the user rather than the first image template based on a predetermined condition, and acquiring a second image with the computing device. The method further includes comparing the second image with the second image template to determine whether the user is authorized to use the computing device based on the predetermined condition, and granting access to the computing device based on the comparison of the second image and the second image template.

In another embodiment of the method, the method includes evaluating the predetermined condition, deleting the second image template in response to the evaluation of the predetermined condition, and designating the first image template for use in authorizing the user after deleting the second image template.

In a further embodiment of the method, evaluating the predetermined condition comprises establishing a timer that indicates a duration of time that the second image template is to be used to authenticate the user, and determining whether the tinier has expired, wherein deleting the second image template is in response to a determination that the timer has expired.

In yet another embodiment of the method, the method includes associating a location with the second image template, and evaluating the predetermined condition comprises determining whether the computing device is at a predetermined distance to the location associated with the second image template, and deleting the second image template comprises deleting the second image template in response to a determination that the computing device exceeds the predetermined distance to the location.

In yet a further embodiment of the method, the location is associated with the second image template in response to the user being authenticated by the user credentials.

In another embodiment of the method, the method includes determining an ambient light level associated with the first image, wherein storing the first image as the second image template further comprises comparing the ambient light level with an ambient light level threshold, and storing the first image as the second image template in response to a determination that the ambient light level exceeds the ambient light level threshold.

In a further embodiment of the method, the comparison of the first image with the first image template results in an image-based authentication failure, and the user credentials authorize the user after the image-based authentication failure. In addition, the method includes incrementing a failure count value in response to the image-based authentication failure, determining whether the failure count value exceeds a failure count threshold value, and replacing the first image template with the second image template such that the first image template is no longer used for image-based authentication.

This disclosure further provides for a system for accessing a computer device, where the system comprises means for acquiring a first image with a computing device, means for comparing the first image with a first image template to determine whether a person corresponding to the first image is authorized to use the computing device, and means for displaying a request for user credentials to authenticate the user based on the comparison of the first image and the first image template. The system further includes means for receiving the user credentials, means for storing the first image as a second image template based on a determination that the user credentials authorizes the user to use the computing device, wherein the second image template is used fir authorizing the user rather than the first image template based on a predetermined condition, and means for acquiring a second image with the computing device. The system also includes means for comparing the second image with the second image template to determine whether the user is authorized to use the computing device based on the predetermined condition, and means for granting access to the computing device based on the comparison of the second image and the second image template.

In another embodiment of the system, the system further includes means for evaluating the predetermined condition, means for deleting the second image template in response to the evaluation of the predetermined condition, and means for designating the first image template for use in authorizing the user after deleting the second image template.

In a further embodiment of the system, the means for evaluating the predetermined condition perform the evaluation by establishing a timer that indicates a duration of time that the second image template is to be used to authenticate the user, and determining whether the timer has expired. In addition, the means for deleting second image template delete the second image template in response to a determination that the timer has expired.

In yet another embodiment of the system, the system further includes means for associating a location with the second image template; and the means for evaluating the predetermined condition perform the evaluation by determining whether the computing device is at a predetermined distance to the location associated with the second image template, and the means for deleting the second image template perform the deletion by deleting the second image template in response to a determination that the computing device exceeds the predetermined distance to the location.

In yet a further embodiment of the system, the system further includes means for determining an ambient light level associated with the first image; and wherein the means for storing the first image as the second image template perform the storage by comparing the ambient light level with an ambient light level threshold, and storing the first image as the second image template in response to a determination that the ambient light level exceeds the ambient light level threshold.

In another embodiment of the system, the comparison of the first image with the first image template results in an image-based authentication failure, and the user credentials authorize the user after the image-based authentication failure. In addition, the system includes means for incrementing a failure count value in response to the image-based authentication failure, means for determining whether the failure count value exceeds a failure count threshold value, and means for replacing the first image template with the second image template such that the first image template is no longer used for image-based authentication.

BRIEF DESCRIPTION OF THE DRAWINGS

Some embodiments are illustrated by way of example and not limitation in the figures of the accompanying drawings.

DETAILED DESCRIPTION

Figure 1:
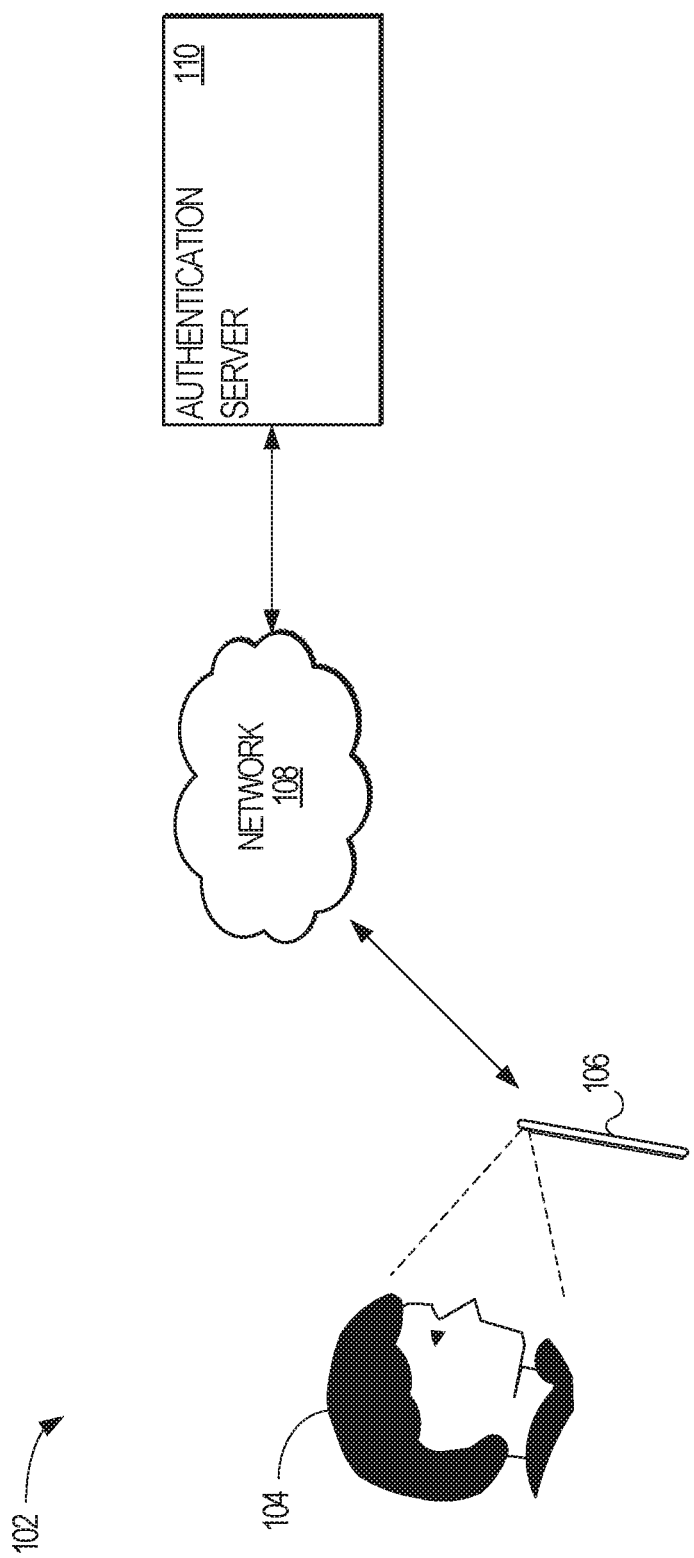
FIG. 1 is a block diagram illustrating a computing device in communication with an image processing server, according to an example embodiment, for authenticating a user using an image recognition technique.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

This disclosure provides systems and methods for performing image-based authentication of a user requesting access to a computing device. In one embodiment, the computing device captures an image of a user to authenticate the user, and compares the captured image with a baseline image template to determine whether the captured image corresponds to the baseline image template. Where the computing device determines that the captured image corresponds to the baseline image template, the computing device may authenticate the user. Where the computing device determines that the captured image does not correspond to the baseline image template, the computing device may first display a prompt or query requesting that the user authenticate himself or herself using a second authentication mechanism, such as a user-input PIN or pattern.

Where the second authentication mechanism is successful (e.g., the user has authenticated himself or herself), the computing device may then determine whether the ambient light in the environment of the captured device and/or the lighting conditions of the captured image are sufficient to have captured an adequate image. In this regard, the computing device may compare the measured ambient light (or the detected ambient light) with one or more ambient light thresholds, such as a lower ambient light threshold (indicating the possibility of darkened conditions) or a higher ambient light threshold (indicating the possibility of brightened conditions).

Where the computing device determines that lighting conditions contributed to the failure in the authentication process, the computing device may store the captured image and use the captured image as a transient image template for future comparisons of captured images. In this regard, the presumption is that the computing device is being used in an environment where the sub-optimal lighting conditions continue to exist, and that the transient image template will be useful in authenticating the user based on images captured within the same environment.

Thus, this disclosure provides a technical improvement to the field of image-based authentication as the use of the transient image template increases the likelihood that the user will be able to access his or her computing device in the event that a subsequently captured image exhibits similar qualities (e.g., poor lighting conditions, blurriness, portions being obscured, etc.) as the initial captured image on which the transient image template is based. However, as security precaution, the computing device may delete, remove, or otherwise make unavailable, the transient image template after a predetermined time period has elapsed. The transient image template may be deleted from the computing device because, as the number of transient image templates increase, the overall security of the computing device decreases. Thus, in addition to the technical benefits to the field of image-based authentication, this disclosure also provides technical benefits to computer security and authentication as the deletion of the transient image template reduces the likelihood that an unauthorized user will gain access to the computing device using a captured image exhibiting similar lighting conditions as the transient image template.

Furthermore, and as discussed below with reference to FIGS. 6A-7B, the disclosure further provides variations on the above embodiments, such as by extending the embodiment to encompass geographic locations and/or to modify an existing template to accommodate lighting conditions that are presumed to continue. Thus, further technical improvements to the functioning of the computing device are disclosed.

This disclosure now turns to the various disclosed embodiments that implement the technical aspects described herein. FIG. 1 is a block diagram illustrating a computing device 106 in communication with an authentication server 110, according to an example embodiment, for authenticating a user 104 using an image recognition technique. In one embodiment, the computing device 106 is configured to authenticate the user 104 by capturing an image of the user 104 and comparing the captured image with an image template. In another embodiment, the computing device 106 is configured to authenticate the user 104 by capturing an image of the user 104, and communicating the captured image to the authentication server 110, which then performs the comparison of the captured image with the image template. The authentication server 110 then communicates the results of the comparison to the computing device 106.

The authentication server 110 provides server-side functionality via a network 108 (e.g., the Internet or wide area network (WAN)) to the computing device 106. The computing device 106, may include a client application and/or modules for interacting with the authentication server 110 and performing image-based authentication of the user 104. Examples of applications that may be instantiated by the computing device 106 include a web client, a single-purpose application (e.g., an "app"), a multi-purpose application (e.g., a programmatic client), or combinations thereof. The image processing server 106 may also be communicatively coupled with other computing devices (not shown) which may include similar applications and/or programs as the computing device 106.

The computing device 106 may comprise, but is not limited to, a mobile phone, desktop computer, laptop, portable digital assistant (PDA), smart phone, tablet, ultra book, netbook, laptop, multi-processor system, microprocessor-based or programmable consumer electronic, or any other communication device that the user 104 may utilize to perform various computing tasks (e.g., accessing the Internet, making a phone call, conducting a video conference, etc.). In some embodiments, the computing device 106 may comprise a display module (not shown) to display information (e.g., in the form of user interfaces). In further embodiments, the computing device 106 may comprise one or more of touch screens, accelerometers, gyroscopes, cameras, microphones, global positioning system (GPS) devices, and so forth. As discussed in more detail below with reference to FIG. 2, the computing device 106 uses its various sensors and hardware components to verify the identity of the user 104 and to store transient images of the user 104 based on various lighting conditions in which the user 104 has captured an image of himself or herself.

In one embodiment, the authentication server 110 is a network-based appliance that conducts bi-directional and/or unidirectional communications with the computing device 106. In some instances, multiple users have may corresponding user accounts verifiable by the computing device 106 (e.g., such as where the computing device 106 is a terminal to an enterprise network), and the multiple users may each request access to the computing device 106 at different times or, where the computing device 106 implements a multi-tasking operating system, at the same time. The one or more users may be a person, a machine, or other means of interacting with the computing device 106. In various embodiments, the user is not part of the networked system 102, but may interact with the networked system 102 via the computing device 106 or another means.

The computing device 106 may communicate with the authentication server 110 through one or more networks 108. Although the one or more networks 108 are illustrated as a single instance, one of ordinary skill in the art will appreciate that multiple networks and/or multiple types of networks may communicatively couple the computing device 106 with the authentication server 110. For example, one or more portions of the one or more networks 108 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The computing device 106 may include one or more applications (also referred to as "apps") such as, but not limited to, a web browser, messaging application, electronic mail (email) application, a communication session application, and the like. In some embodiments, if the communication session application is stored on the computing device 106 as a native application, then this application is configured to locally provide the user interface and at least some of the functionalities used to communicate with the authentication server 110 (e.g., authenticate a user, establish a communication channel between one or more computing devices and/or services, display or output audio and/or video, capture audio and/or video using one or more input devices, etc.). Conversely if the communication session client is not stored on the computing device 106, the computing device 106 may use its web browser to access the services provided by the authentication server 110.

The user 104 may interact with the networked system 102 via the computing device 106 or other means. For instance, the user 104 provides input (e.g., touch screen input or alphanumeric input) to the computing device 106 and the input is communicated to the networked system 102 via the network 108. In this instance, the authentication server 110, in response to receiving the input from the user 104 or an instruction from the computing device 106, communicates information to the computing device 106 via the network 108 to be presented to the user 104. In this way, the computing device 106 facilitates interactions between the user 104 and the authentication server 110.

Further, while the networked system 102 shown in FIG. 1 employs a client-server architecture, the present subject matter is of course not limited to such an architecture, and could equally well find application in a distributed, or peer-to-peer, architecture system, for example.

The computing device 106 is configured to authenticate the user 104 using one or more image recognition techniques. In one embodiment, the computing device 106 instantiates a facial recognition application or other module that uses an image of the user 104 to determine whether the user 104 is authorized to access the computing device 106. For example, by using a camera or other image capture device of computing device 106. The facial recognition application may leverage one or more image recognition libraries for performing the facial recognition, such as the Open Source Computing Vision Library (OpenCV), which is an open source computer vision and machine learning software library. OpenCV includes interfaces for a variety of computing programming and scripting languages, such as C++, Python, Java, and MATLAB and can be instantiated under various operating systems including Microsoft Windows, Linux, Google Android, and Mac OS. Additionally and/or alternatively, the facial recognition application may be implemented using Windows Hello, which is a biometric sign-in system for a computing operating system, and is available from the Microsoft Corp., located in Redmond, Wash.

Accordingly, the computing device 106 may include one or more libraries from OpenCV, which are then accessed by the applications instantiated by the computing device 106. Additionally and/or alternatively, the authentication server 110 may instantiate one or more libraries of OpenCV, and the computing device 106 may communicate one or more images to the authentication server 110 for authentication and/or further processing. Further still, the computing device 106 and/or the authentication server 110 may instantiate one or more applications developed using Windows Hello.

In one embodiment, the user 104 interacts with the computing device 106 to establish a baseline image template of the user 104. As one of ordinary skill in the art will understand, a baseline image template is an image template that a computing device uses to perform comparisons with other images, and to determine whether one or more images include the baseline image template and/or are similar to the baseline image template. In this context, the baseline image template may be used by the computing device 106 to authenticate the user 104, where the user 104 uses the computing device 106 to acquire one or more images of the user 104 and compares the acquired image(s) with the baseline image template. Additionally and/or alternatively, the authentication server 110 may receive one or more acquired image(s) from the computing device 106 and communicate instructions to the computing device 106 as to whether the user 104 is authenticated. Thus, in this regard, one or more of the operations described as being performed by the computing device 106 may instead be performed by the authentication server 110.

The comparisons performed by the computing device 106 include, but are not limited to, histogram matching, template matching, and/or feature matching. Where the computing device 106 is configured to perform template matching, the computing device 106 may be configured to employ various template matching techniques including, but not limited to, sum of squared difference, normalized sum of square differences, cross-correlation, normalized cross-correlation, correlation-coefficient, and other such template matching techniques or combinations thereof.

Where the computing device 106 employs feature matching, the computing device 106 may determine various features from the baseline image template, and store these determined features as baseline image features. Thus, when the computing device 106 acquires an image of the user 104 to authenticate (e.g., by capturing an image of the user 104 using a camera), the computing device 106 may determine various features from the captured image (e.g., captured image features), and compare the captured image features with the baseline image features. The types of feature matching performable by the computing device 106 include, but are not limited to, scale-invariant feature transform (SIFT), speeded-up robust features (SURF), robust independent elementary feature (BRIEF), Features from Accelerated Segment Test (FAST), and Oriented FAST and Rotated BRIEF (ORB).

One of the challenges in using image-based authentication is that the captured image of the 104 may vary depending on the environment in which the computing device 106 is being used. For example, the user 104 may be in an environment that is dark or has low-lighting conditions or the user 104 may be in an environment that is overly bright and has bright-lighting conditions. In this context, low light and bright light are relative to the light acquired by the camera of the computing device 106. Thus, the user 104 may perceive lighting conditions that he or she believes is acceptable but the computing device 106 obtains an image of the user 104 that has measurably dark areas and/or overexposed areas. As another example, the user 104 may be unable to properly focus the camera lens of the computing device 106, in which case, the resulting image may be blurry or out-of-focus.

Where the computing device 106 acquires an image of the user 104 with problematic qualities (e.g., underexposed areas, overexposed areas, blurriness, obscured portions, etc.), the computing device 106 and/or the authentication server 110 may be unable to match the acquired image with the baseline image template (e.g., through one or more template matching techniques and/or one or more image feature matching techniques). Accordingly, where the computing device 106 and/or the authentication server 110 is unable to authenticate the user 104 using image-based authentication, the computing device 106 may use a secondary means of authenticating the user 104. In one embodiment, the secondary means include displaying a prompt on a display of the computing device 106 that requests the user 104 to provide a particular input. The particular input may include, but is not limited, a PIN, a pattern, a selection of one or more images, or any other combinations of input. The particular input may also include non-tactile input, such as a voice recognition input.

The computing device 106 may then determine whether the secondary means of authentication have authenticated the user 106. Where the user 106 has successfully authenticated himself or herself using the secondary means, the computing device 106 may store a temporary or transient copy of the captured image of the user 106 that the computing device 106 used to unsuccessfully authenticate the user. The computing device 106 stores the temporary or transient copy based on the presumption that, because the user 104 has authenticated himself or herself using the secondary means of authentication, then the image quality (e.g., the lighting conditions) of the captured image used to initially authenticate the user 104 were probably poor (e.g., the light of the captured image was below or above a predetermined ambient light threshold), which resulted in the computing device 106 being unable to authenticate the user 104 through image-based authentication. Additionally and/or alternatively, the computing device 106 instructs the authentication server 110 to store the captured image as the temporary or transient image.

The computing device 106 then uses the temporary or transient copy of the captured image to later authenticate the user 104. In one embodiment, the computing device 106 and/or the authentication server 110 establishes the temporary or transient copy of the captured image as a transient image template by which to later authenticate the user 104. In this embodiment, the computing device 106 and/or the authentication server 110 uses the transient image template to compare with later acquired images of the user 104, such as through template matching, histogram matching, and/or feature matching. Where feature matching is employed, the computing device 106 may determine one or more features from the transient image template, and store the determined features as temporary features for comparing with determined features of later acquired images of the user 104.

The transient image template is temporary or transient because the computing device 106 and/or authentication server 110 may be programmed or configured with a predetermined time period that indicates how long the computing device 106 and/or the authentication server 110 should retain the temporary or transient copy of the captured image. In this regard, where the computing device 106 and/or the authentication server 110 receives a request to authenticate the user 104 using image-based authentication, and the predetermined time period for the transient image template has not expired, the computing device 106 and/or the authentication server 110 compares an acquired image of the user 104 with the transient image template (e.g., through template matching, feature matching, etc.). In some instances, the computing device 106 may compare the acquired image with both the baseline image template (e.g., in a first-pass authentication attempt) and the transient image template (e.g., in a second-pass authentication attempt where the first-pass authentication attempt fails).

There are several benefits to configuring the computing device 106 and/or the authentication server 110 to use a transient image template. A first benefit is that the transient image template solves the near-term problem of the user 104 being in an environment with poor lighting conditions. While the computing device 106 and/or the authentication server 110 may have been programmed or configured with a baseline image template of the user 104, the images of the user 104 acquired in the poor lighting environment may result in authentication failures by the computing device 106 and/or the authentication server 110 as the baseline image template may have different levels of lighting exposure than the acquired images. Thus, the transient image template, acquired in the poor lighting environment, serves as a better basis by which to compare later acquired images of the user 104 in the poor lighting environment. The foregoing features result in improved usability and human-machine interactions because these features reduce the number of times that the user authenticates himself or herself using the secondary means of authentication (e.g., the user's PIN). For example, where the user accesses their phone regularly while at a particular location with particular lighting conditions, the computing device 106 queries for the user's PIN only on the first failed attempt and then "learns" from that failure so as not to query the user again with a PIN for those same lighting conditions.

Another benefit is that the computing device 106 and/or authentication server 110 frees up the storage space used by the transient image template. As the user 104 is likely to use the computing device 106 in different environments, and that the lighting conditions of the different environments is likely to vary, the computing device 106 and/or authentication server 110 may store a number of transient image templates. Thus, through continued use of the computing device 106, an increasing amount of storage space of the computing device 106 and/or of the authentication storage 110 becomes devoted to storing transient image templates. Thus, by deleting the transient image templates after a predetermined time period has elapsed, the computing device 106 and/or the authentication server 110 frees up storage space to use for other purposes or to store additional transient image templates.

Yet another benefit of the deletion of the transient image templates is in the security that it provides. As the number of transient image templates increases, the likelihood that an image acquired of the user 104 matches one or more of the transient image templates also increases. Thus, the inherent security provided by using image-based authentication decreases. Accordingly, by deleting the transient image template after the expiration of a predetermined time period, the computing device 106 and/or the authentication server 110 returns to its security state with the baseline image template.

In addition to, or instead of, the foregoing use of time-limited transient image templates, the computing device 106 and/or the authentication server 110 may be configured to assign particular locations to particular transient image templates. In one embodiment, and as discussed below with reference to FIG. 2, the computing device 106 may include a Global Positioning System (GPS) transceiver, which the computing device 106 uses to determine its location. At the time the computing device 106 and/or authentication server 110 creates a transient image template from an acquired image of the user 104, the computing device 106 and/or authentication server 110 may associate a set of GPS coordinates with the transient image template. Where featuring matching is employed by the computing device 106 and/or authentication server 110, the computing device 106 and/or authentication server 110 may also associate the GPS coordinates with one or more transient image features. In this manner, should the user 104 move to various locations, the computing device 106 knows which transient image template and/or transient image features to use in a comparison of an acquired image of the user 104 based on the location of the computing device 106.

In one embodiment where the computing device 106 and/or authentication server 110 associates GPS coordinates with transient image templates and/or transient image features, the computing device 106 and/or the authentication server 110 may also establish a predetermined range in which a transient image template and/or transient image feature is referenced relative to its associated GPS coordinates. The predetermined range may vary from a few feet to a few hundred yards. In this manner, where the user is within the predetermined range of a stored set of GPS coordinates (e.g., one or more GPS coordinates associated with one or more transient image templates or transient image features), the computing device 106 and/or the authentication server 110 references the transient image template and/or the transient image templates associated with the stored set of GPS coordinates, Thus, the computing device 106 need not be at the exact same location as the computing device 106 was located when the transient image template and/or transient image features were created for performing image-based authentication using the transient image template and/or the transient image features.

In addition to deleting the transient image templates and/or transient image features based on the expiration of assigned predetermined time periods, the computing device 106 and/or the authentication server 110 may also delete the transient image templates and/or transient image features based on location. In one example, the computing device 106 and/or the authentication server 110 may be configured to delete the transient image templates and/or transient image features when the computing device 106 is outside of a predetermined range associated with one or more of the GPS coordinates associated with the transient image templates and/or transient image features. The predetermined range may be measured using one or more distance metrics including, but not limited to, feet, yards, meters, kilometers, miles, and other such measures of distances. In one embodiment, the predetermined range is configurable by the user 104, such as by providing an input at the time the transient image template and/or transient image feature is created indicating the predetermined range that would trigger a deletion of the transient image template and/or transient image features. In another embodiment, the computing device 106 and/or authentication server 110 are preconfigured with a predetermined range that causes the deletion of the transient image template and/or transient image features.

In yet a further embodiment of the disclosed computing device 106 and/or authentication server 110, the computing device 106 and/or authentication server 110 is configured to augment and/or modify an existing baseline image template using one or more previously captured images. Additionally and/or alternatively, the computing device 106 and/or the authentication server 110 establishes a new baseline image template rather than modifying an existing baseline image template. In summary, the process involves establishing a new baseline image template after a predetermined number of image-based authentication failures have occurred with the baseline image template. The presumption with this process is that the user 104 is in an environment where captured images of the user 104 are incompatible with an existing baseline image template of the user 104 and the user 104 is unable to authenticate himself or herself using the captured images and the existing baseline image template.

In one embodiment, the computing device 106 and/or the authentication server 110 establishes a new baseline image template and/or baseline image features by determining the number of failures that have occurred using image-based authentication with the current baseline image template at a particular location and/or during a predetermined time period. In this regard, the computing device 106 and/or the authentication server 110 may maintain a global failure count for the current baseline image template and/or a specific failure count for a particular location where the current baseline image template is used for image-based authentication. Where the failure count meets or exceeds a configurable failure count threshold, this result signals to the computing device 106 and/or authentication server 110 that the current baseline image template is not suitable for the location in which the image-based authentication is being performed. In one embodiment, the computing device 106 and/or the authentication server 110 may then select an acquired image and/or a transient image template as a new baseline image template.

Thus, this disclosure describes various embodiments of using transient image templates and/or transient image features to perform image-based authentication of the user 104. This disclosure also describes embodiments where a baseline image template and/or baseline image features are replaced and/or modified in response to a determination that image-based authentication has failed after a predetermined number of images of the user 104 have been captured. Furthermore, any of the foregoing embodiments may be used in combination with each other; thus, the computing device 106 may be configured according to various combinations of the foregoing embodiments.

Figure 2:
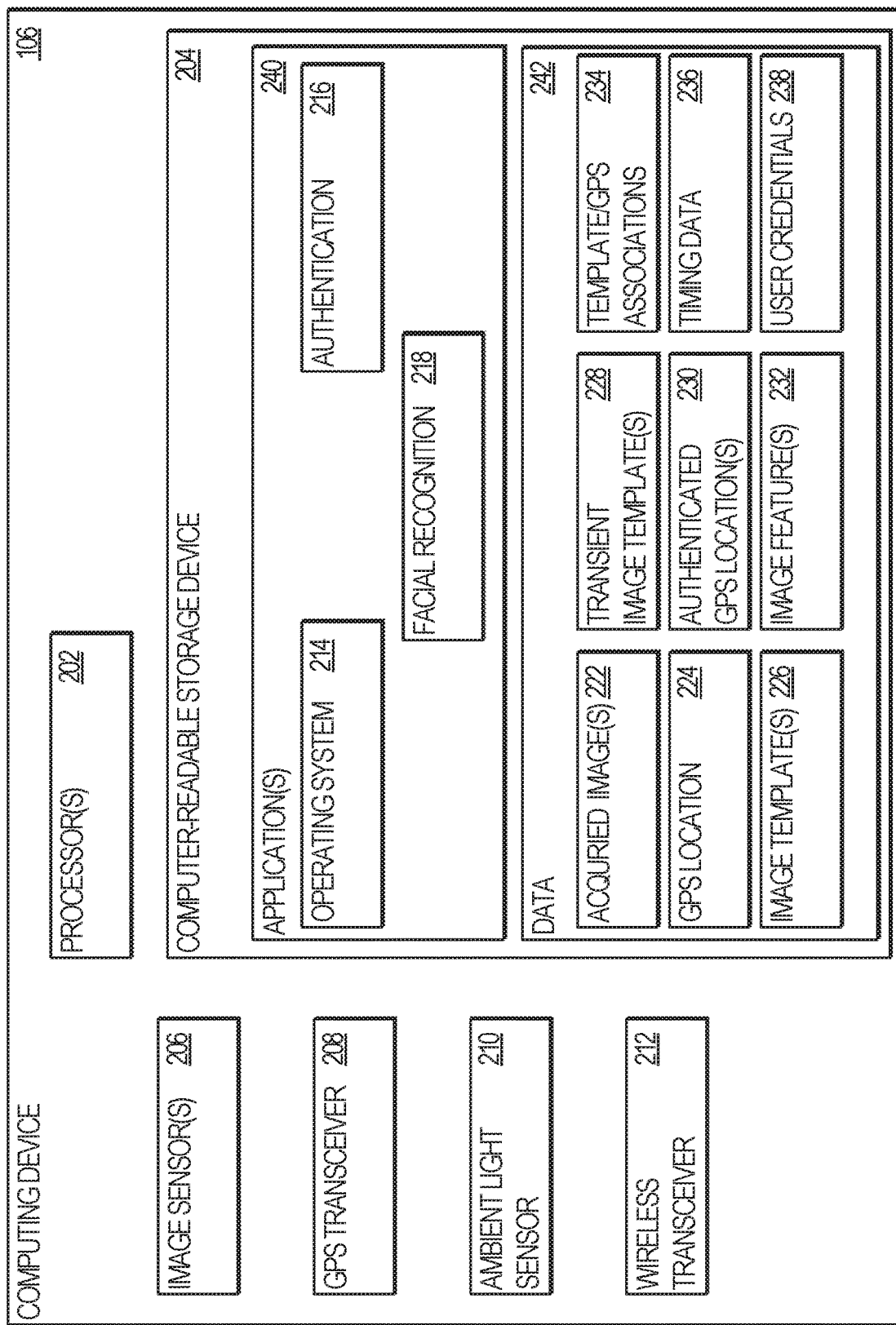
FIG. 2 illustrates an example embodiment of the application(s) and data of the computing device of FIG. 1.

FIG. 2 illustrates applications and data of the computing device 106 illustrated in FIG. 1, according to an example embodiment, where the computing device 106 is configured according to one or more of the foregoing embodiments. As shown in FIG. 2, and in one embodiment, the computing device 106 is a mobile device 106. The computing device 106 is configured with various sensors and/or transceivers 206-212 and includes various application(s) 240 and data 242 to facilitate the image-based authentication of the user 104.

The various functional sensors, transceivers, and other hardware and/or software of the computing device 106 and/or the authentication server 110 may reside on a single device or may be distributed across several computers in various arrangements. The various components of the computing device 106 and/or the authentication server 110 may access one or more databases and each of the various components of the computing device 106 and/or the authentication server 110 may be in communication with one another. Further, while the components of FIG. 2 are discussed in the singular sense, it will be appreciated that in other embodiments multiple instances of the components may be employed.

In one embodiment, the computing device 106 includes one or more processors 202 that execute or implement one or more of the applications 240. The one or more processors 202 may be any type of commercially available processor, such as processors available from the Intel Corporation, Advanced Micro Devices, Texas Instruments, or other such processors. Further still, the one or more processors may include one or more special-purpose processors, such as a Field-Programmable Gate Array (FPGA) or an Application Specific Integrated Circuit (ASIC). The one or more processors may also include programmable logic or circuitry that is temporarily configured by software to perform certain operations. Thus, once configured by such software, the one or more processors become specific machines (or specific components of a machine) uniquely tailored to perform the configured functions and are no longer general-purpose processors.

The computing device 106 may further include various computer-readable storage device(s) 204 and/or computer-readable medium(s) for storing the application(s) 240 and/or the data 242. The computer-readable storage device 204 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable storage device" should be taken to include a single device or multiple devices (e.g., a centralized or distributed database, or associated caches and servers) able to store the application(s) 240 and the data 242. Accordingly, the computer-readable storage device 204 may be implemented as a single storage apparatus or device, or, alternatively and/or additionally, as "cloud-based" storage systems or storage networks that include multiple storage apparatus or devices.

The computing device 106 may also include various sensors and/or transceivers in furtherance of establishing one or more temporary template images and/or temporary template features. In one embodiment, the computing device 106 includes one or more image sensor(s) 206 for acquiring one or more images of the user 104, Which the computing device 106 may use as one or more baseline image templates, for determining one or more baseline image features, as one or more transient image templates, for determining one or more transient image features, and/or for attempting to authenticate. Examples of image sensor(s) 206 include, but are not limited to, semiconductor charge-coupled devices (CCD), active pixel sensors in complementary metal-oxide-semiconductor (CMOS), and/or active pixel sensors in N-type metal-oxide-semiconductor (NMOS). The image sensor(s) 206 may also include infrared sensors 206, such as a forward-looking infrared (FUR) sensor.

Additionally and/or alternatively, the computing device 106 may include a GPS transceiver 208. The UPS transceiver 208 is configured to obtain one or more UPS coordinates corresponding to the location of the computing device 106. As discussed below, the obtained GPS coordinates may be associated with one or more transient image templates and/or transient image features upon the successful authentication of the user using one or more secondary means of authentication.

Furthermore, the computing device 106 may include one or more ambient light sensors 210. The one or more ambient light sensors 210 are configured to measure the ambient light of the environment in which the computing device 106 is located. For example, the one or more ambient light sensors 210 may provide a measurement of the ambient light of an image acquired by the image sensor(s) 206. As discussed below with reference to FIGS. 3A-3B, the ambient light measured by the ambient light sensors 210 may serve as an indicator as to whether the environment in which the computing device 106 is located is dark or bright (e.g., the measurements are below or above corresponding ambient light thresholds), which would indicate that an authentication failure in comparing an acquired image with a baseline image template is likely due to poor lighting conditions rather than other defects in the acquired image. In some examples, the ambient light sensor may be a function of the image sensor(s) 206.

Finally, the computing device 106 may include one or more wireless transceivers 212 for communicating wirelessly with one or more other devices and/or systems, such as the authentication server 110. In this context, the one or more wireless transceivers 212 include various transceivers that facilitate wireless communications including, but not limited to, a Wi-Fi transceiver (e.g., a transceiver configured to communicate using IEEE 902.11 a/b/g/n), a Bluetooth® transceiver, a cellular radio (e.g., a radio configured to communicate using Long-Term Evolution (LTE), Global System for Mobile communications (GSM), Code-division multiple access (CDMA), and other such wireless transceivers or combinations thereof. In one embodiment, the one or more wireless transceivers 212 are configured to communicate data to and/or from the computing device 106, such as one or more acquired images and/or authentication input provided by the user 104.

With reference to FIG. 2, the application(s) 240 of the computing device 106 are configured to perform image-based authentication of the user 104 and to grant and/or deny access to the computing device 106 based upon the results of the image-based authentication. In addition, the application(s) 240 are configured to store transient or transient image templates and/or transient image features in response to the image-based authentication process. Further still, the application(s) 240 may be configured to modify and/or generate replacement baseline image templates and/or baseline image features in response to a determination that a threshold number of captured images have been obtained that are also associated with a successful authentication of the user 104 using secondary authentication means. In one embodiment, the application(s) 240 are written in a computer-programming and/or scripting language. Examples of such languages include, but are not limited to, C, C++, C #, Java, JavaScript, Perl, Python, or any other computer programming and/or scripting language now known or later developed.

To perform these and other operations in furtherance of these results, the application(s) 240, include but are not limited to, an operating system 214, an authentication application 216, and a facial recognition application 218. Although FIG. 2 references the items 214-218 as "applications," one of ordinary skill in the art will appreciate that these items 214-218 may also be implemented as sub-modules of an independent application or may also be implemented as one or more software libraries to which another application (e.g., the operating system 214) has access. Further still, while the computing device 106 may include alternative and/or additional modules or applications (e.g., a networking application, a printing application, a software-implemented keyboard, etc.), such alternative and/or additional modules and/or applications are not germane to this disclosure and the discussion of such is hereby omitted for brevity and readability.

The data 242 that is used and/or supports the application(s) 240 include, but is not limited to, one or more acquired image(s) 222, a current GPS location 224, one or more image template(s) 226, one or more temporary (or transient) image template(s) 228, and one or more authenticated GPS location(s) 230. In addition, the data 242 may include one or more determined image feature(s) 232, one or more associations 234 between the transient image template(s) 228 and the authenticated UPS location(s) 230, various timing data 236, and the user credentials 238 that are used to authenticate the user 104. As with the application(s) 240, the data 242 may include alternative and/or additional data, such as user credentials, operating system states, web browser data, etc., that are not germane to this disclosure and the discussion of such is hereby omitted for brevity and readability.

The operating system 214 is configured to execute and/or access one or more of the application(s) 240 and to control the functionalities of the various sensors and/or transceivers 206-212. The operating system 214 may be configured to operate the computing device 106 in various states, such as an unlocked and locked state, where the unlocked state allows the user 104 to access the various functionalities of the operating system 214 and the locked state restricts the user 104 from accessing the various functionalities of the operating system 214 and/or to place restrictions on the mode of operation of the computing device 106. Examples of operating systems that the one or more processor(s) 202 may execute include, but are not limited to, Microsoft® Windows 10 Mobile, Google Android, Apple iOS, Blackberry Secure, and other such operating systems. In one embodiment, the operating system 214 leverages an authentication application 216 to authenticate the user 104 as an authorized user of the computing device 104.

The authentication application 216 is configured to authenticate the user 104 using one or more authentication means. Examples of these authentication means include non-biometric means, such as a username/password combination, a PIN, a secret pattern, or other input-based authentication means. The authentication application 216 may also perform biometric-based authentication including, but not limited to, fingerprint recognition, image-based authentication, voice analysis recognition, and other such means for biometric authentication.

In one embodiment, the authentication application 216 is configured to perform image-based authentication of the user 104 in response to a request by the operating system 214 to grant the user 104 access to the computing device 106. For example, the computing device 106 may be in a locked state and the user 104 has requested that the computing device 106 be placed into an unlocked state. Thus, to unlock the computing device 106, the operating system 214 may request that the authentication application 216 authenticate the user.

In one embodiment, the authentication application 216 authenticates the user 104 via image-based authentication. In this regard, the data 242 may include one or more image template(s) 226 that correspond to images of a user authorized to access the computing device 106, such as one or more images of the user 104. As one of ordinary skill in the art will understand, an image template, as used in facial recognition, is an image that a facial recognition program or module attempts to find in another image or in a portion of the other image. The image template(s) 226 may be stored in one or more image formats including, but not limited to, Portable Network Graphics (PNG), Bitmap (BMP), Joint Photographic Experts Group (PEG/PG), or other such image formats or combinations thereof.

Accordingly, the authentication application 216 may invoke and/or execute the facial recognition application 218 to perform a facial recognition operation of the user 104 using the one or more image template(s) 226. In one embodiment, the one or more image template(s) 226 are established during a registration operation, in which one or more acquired image(s) are assigned as baseline image template(s) by which to later authenticate the user 104 when the user 104 attempts to access the computing device 106. In this regard, a baseline image template(s) 226 that remains on the computing device 106 and/or authentication server 110. However, as discussed below, there may be instances where the computing device 106 and/or the authentication server 110 replaces the baseline image template(s) 226.

To perform the facial recognition operation, the facial recognition application 218 may invoke the one or more image sensor(s) 206 to acquire one or more images of the user 104, which are subsequently stored as the acquired image(s) 222. In this embodiment, the facial recognition application 218 then performs one or more image template matching operations in an attempt to match one or more of the image template(s) 226 which the acquired image(s) 222. As discussed above, the image template matching operations may include, but are not limited to, sum of squared difference, normalized sum of square differences, cross-correlation, normalized cross-correlation, correlation-coefficient, and other such template matching techniques or combinations thereof.

Additionally and/or alternatively, the facial recognition application 218 may perform feature-based matching use one or more image feature(s) 232 extracted and/or determined from the image template(s) 226. Accordingly, the image feature(s) 232 to be matched may be stored as image feature(s) 232. As discussed above, the facial recognition application 218 may perform image feature matching operations including, but not limited to, SIFT, SURF, BRIEF, FAST, ORB, or combinations thereof.

As contemplated by this disclosure, the disclosed subject matter addresses the circumstances where an initial image-based authentication operation fails due to one or more environmental conditions, such as due to the poor lighting conditions of the environment in which the acquired image(s) 222 were acquired. Although the image-based authentication performed by the authentication application 216 may succeed on a first attempt in a particular environment, the subject matter of this disclosure is directed to subsequent attempts of unlocking the computing device 106 where there is a failure in the image-based authentication, particularly in circumstances where the lighting or other environmental conditions affect the resulting image of the user 104 acquired by the computing device 104.

In one embodiment, the facial recognition application 218 acquires one or more image(s) 222 of the user 104 in response to a request from the authentication application 216, such as where the user 104 has requested the operating system 214 to unlock the computing device 106. For example, the facial recognition application 218 may instruct one or more of the image sensor(s) 206 to acquire one or more image(s) 222 of the user 104. Where the facial recognition application 218 is configured to perform template matching operations, the facial recognition application 218 may perform one or more template matching operations using the acquired image(s) 222 and the image template(s) 226. Additionally and/or alternatively, where the facial recognition application 218 is configured to perform feature matching operations, the facial recognition application 218 may determine one or more features from the acquired image(s) 222, and compare these determined features with the image feature(s) 232 of the image template(s) 226. The facial recognition application 218 may then inform the authentication application 216 whether there is a match between the acquired image(s) 222 (or acquired image feature(s)) and the one or more image template(s) 226 (or image feature(s) 232). As one of ordinary skill in the art will understand, a match does not necessarily signify a 100% correspondence between the compared image(s) 222-226 and/or compared feature(s), but that the facial recognition application 218 has determined that there is a likelihood of a match (e.g., a 90% or 95% probability).

Where the facial recognition application 218 is unable to determine whether there is a match (e.g., the facial recognition application 218 returns an execution call with an exception or error message) or the facial recognition application 218 determines that there is not a match, the facial recognition application 218 informs the authentication application 216 accordingly (e.g., by returning an execution call with a particular message, error value, and/or other indicator). The authentication application 216 may then prompt the user 104, via a display of the computing device 106, to authenticate himself or herself using a secondary means of authentication (e.g., by providing a PIN, secret pattern, etc.).

In one embodiment, the authentication application 216 references the user credentials 238 to authenticate the user 104 via the secondary means of authentication. The user credentials 238 may include, but are not limited to, a PIN, a secret pattern, a username and password, or other set of credentials that authenticate the user 104 to the computing device 106.

Where the user 104 successfully authenticates himself or herself to the authentication application 216, this signals to the authentication application 216 that the user 104 is authorized to access the computing device 106. Further still, it indicates that the acquired image(s) 222 may have been visually deficient (e.g., over exposed, underexposed, blurry, etc.) but that the acquired image(s) 222 could have been used to authenticate the user 104.

Accordingly, in one embodiment, the facial recognition application 218 is established with various thresholds, a margin of error, and/or a degree of tolerance to accommodate situations where the acquired image(s) 222 should have authenticated the user 104, but the quality of the acquired image(s) 222 prevented from the facial recognition application 218 from confirming the authentication. Where the comparison of the acquired image(s) 222 with the image template(s) 226 indicate a failed match, but are within the margin of error, the acquired image(s) 222 are temporarily stored. Where the user 104 then authenticates himself or herself to the authentication application 216 via the secondary means of authentication following the unsuccessful authentication of the user 104 via the acquired image(s) 222, the facial recognition application 218 then stores one or more of the acquired image(s) 222 as transient images or transient image template(s) 228. The acquired image(s) 222 are stored as the transient image template(s) 228 because the comparison of the acquired image(s) 222 with the baseline image template(s) 226 has indicated that the acquired image(s) 222 are almost a sufficient match (e.g., because the comparison yields a value at or above a margin of error but below a matching threshold), which indicates that one potential factor affecting the comparison could be the environment in which the acquired image(s) 222 were acquired. Thus, by establishing the acquired image(s) 222 as the transient image template(s) 228, the facial recognition application 218 can reference the transient image template(s) 228 to authenticate the user 104 in subsequent attempts under the presumption that the subsequent images are being acquired within the same environment (e.g., under the same environmental conditions) as the transient image template(s) 228.

Recognizing that the user 104 may move the computing device 106 from one environment to another environment, this disclosed facial recognition application 218 is configured to associate timing data 236 with one or more of the transient image template(s) 228. In one embodiment, the timing data 236 includes a timer having a predetermined time period, wherein a timer is associated with each of the transient image template(s) 228. The predetermined time period may be measured in seconds, minutes, hours, days, or any other increment of time. One example of a predetermined time period is five minutes.

During the lifetime of a timer, the operating system 214 and/or the facial recognition application 218 decrements the timer. Upon expiration of the timer, the corresponding transient image template 228 is deleted by the facial recognition application 218. By deleting the transient image template 228 associated with the expired timer, the facial recognition application 218 preserves the security of the computing device 106 as well as reclaims any storage space that the transient image template may have been using.

In addition to, or instead of, associating timing data 236 with one or more of the transient image template(s) 228, the computing device 106 may also be configured to associate one or more authenticated GPS location(s) 230 with the one or more transient image template(s) 228. These associations may be stored as the template/GPS associations 234. In some instances, the physical location of the computing device 106 may affect the image quality of the one or more acquired image(s) 222. In general, an authenticated GPS location is a location where the user 104 has authenticated himself or herself to the computing device 106 (e.g., via the authentication application 216). Further still, the authentication application 216 may record a GPS location 224 as an authenticated GPS location 230 where the user 104 was required to use a secondary means of authentication in response to a failure in the image-based authentication mechanism.

As discussed above, the facial recognition application 218 may store one or more acquired image(s) 222 as one more transient image template(s) 228. In addition, where the authentication application 216 is configured to communicate with the GPS transceiver 208 and/or access the stored GPS location 224 in the data 242, the authentication application 216 and/or the facial recognition application 218 may establish an association 234 between the one or more transient image template(s) 228 and the GPS location 224 (which becomes subsequently stored as an authenticated GPS location 230). In this manner, where the user 104 remains at a particular location or revisits a particular location, the facial recognition application 218 and/or the authentication application 216 queries the authenticated GPS location(s) 230 to determine whether there is an existing authenticated UPS location 230 for the particular location (e.g., as indicated by the GPS location 224). Where there is an authenticated location 230 for the particular location, the facial recognition application 218 then queries the template/GPS associations 234 to obtain the corresponding transient image template(s) 228 associated with the authenticated location 230. The facial recognition application 218 then references the obtained transient image template to perform image-based authentication of the user 104 with one or more of the acquired image(s) 222.

In addition, one or more of the transient image template(s) 228 may also be associated with an authenticated GPS location 230 and timing data 236 (e.g., an expiration timer). In this regard, where the computing device 106 is at, or within a predetermined distance to, an authenticated UPS location 230, the facial recognition application 218 and/or the authentication application 216 determines whether there is a corresponding transient image template 228 and, if so, whether timing data 236 indicates that the transient image template 228 has expired. Where the transient image template 228 has not expired, the facial recognition application 218 and/or the authentication application 216 then references the transient image template in performing an image-based authentication.

In this manner, the computing device 106 is configured to determine which transient image template 228 to use based on the location of the computing device 106. As the computing device 106 may include one or more transient image template(s) 228, an association with an authorized UPS location 230 (e.g., via the template/GPS associations 234) allows the computing device 106 to more readily determine which of the transient image template(s) 228 to use in performing image-based authentication of the user 104. Accordingly, the use of the authorized GPS location(s) 230 and the template/GPS associations 234 represent an improvement over prior art techniques for authenticating a user.

One of ordinary skill in the art will appreciate that the GPS location 224 is not solely limited to a location determined using GPS. In this regard, the GPS location 224 may be any location determined by the computing device 106 using one or more combinations of geolocation technologies including, but not limited to, cellular triangulation (e.g., via a wireless transceiver 212), Wi-Fi-based positioning system (WiPS/WFPS), Internet Protocol (IP) address geolocation, and other such geolocation technologies. Accordingly, the authenticated GPS location(s) 230 are not limited to those locations determined using GPS, but also include any location determined using one or more of the foregoing geolocation technologies.

In some instances, it may be prudent and/or beneficial to modify and/or augment the baseline image template(s) 226. Accordingly, in one embodiment, the authentication application 216 is configured to develop and/or modify the baseline image template(s) 226 after a predetermined number of repeat failures of image-based authentication, after image-based authentication has failed a predetermined number of times within a given time period, after image-based authentication has failed after a predetermined number of time at or near the same location, and/or after the computing device 106 has acquired a predetermined number of transient image template(s) 228 for a particular location. In these instances, the authentication application 216 may determine that the failure rate of the image-based authentication meets and/or exceeds an acceptable failure rate. For example, the computing device 106 may be programmed and/or configured with one or more failure rates corresponding to the different types of potential failures (e.g., failures based on a number of attempts; failures based on a number of attempts within a predetermined time period, and failures based on a number of attempts at a particular location). These failures may occur where the environment surrounding the computing device 106 makes it difficult for one or more of the image sensor(s) 206 to capture an adequate and/or acceptable image of the user 104 for use in authentication.

To address this deficiency, the authentication application 216 and/or the facial recognition application 218 may record and/or monitor the number of image-based authentication failures that have occurred at a location or within a predetermined time period. In one embodiment, the failures are recorded and/or monitored after a transient image template has been deleted or removed. The presumption with this approach is that the environment in which the computing device 106 is located is causing the computing device 106 to repeatedly divert to the transient image template(s) 228, in which case, it would make sense for the computing device 106 to reference a transient image template as a baseline image template. Thus, in one embodiment, for purposes of modifying or replacing a baseline image template 226, an image-based authentication failure is recorded after a transient image template has been used and has expired.

In one embodiment, the authentication application 216 and/or the facial recognition application 218 replaces one or more of the baseline image template(s) 226 with one or more of the transient image template(s) 228 after a number of image-based authentication failures have reached a predetermined threshold. In one embodiment, the failure threshold is based on a time, such as three image-based authentication failures within 20 minutes (e.g., a predetermined duration of time). In another embodiment, the failure threshold is based on location, such as five image-based authentication failures at the same location (or approximate location as provided by the GPS transceiver 208). In yet a further embodiment, the failure threshold may be based on both time and location, such as five image-based authentication failures at the same location within a 20 minute time period.

In this manner, the computing device 106 is configured to modify and/or replace one or more baseline image template(s) 226 with their transient counterparts after a failure threshold has been met or exceeded. This approach is technically beneficial because it improves the way in which the computing device 106 performs facial recognition in environments that are problematic and/or cause image-based authentication failures with previously stored baseline image template(s) 226. This approach is further technically beneficial because it reduces the amount of storage space occupied by the transient image template(s) and reduces the amount of computing resources needed to compare the acquired image(s) with the baseline image template(s) 226 (e.g., the facial recognition application 218 compares with acquired image(s) 222 with the baseline image template(s) 226 rather than having to compare the acquired image(s) 222 with the various transient image template(s) 228.)

Figure 3A:
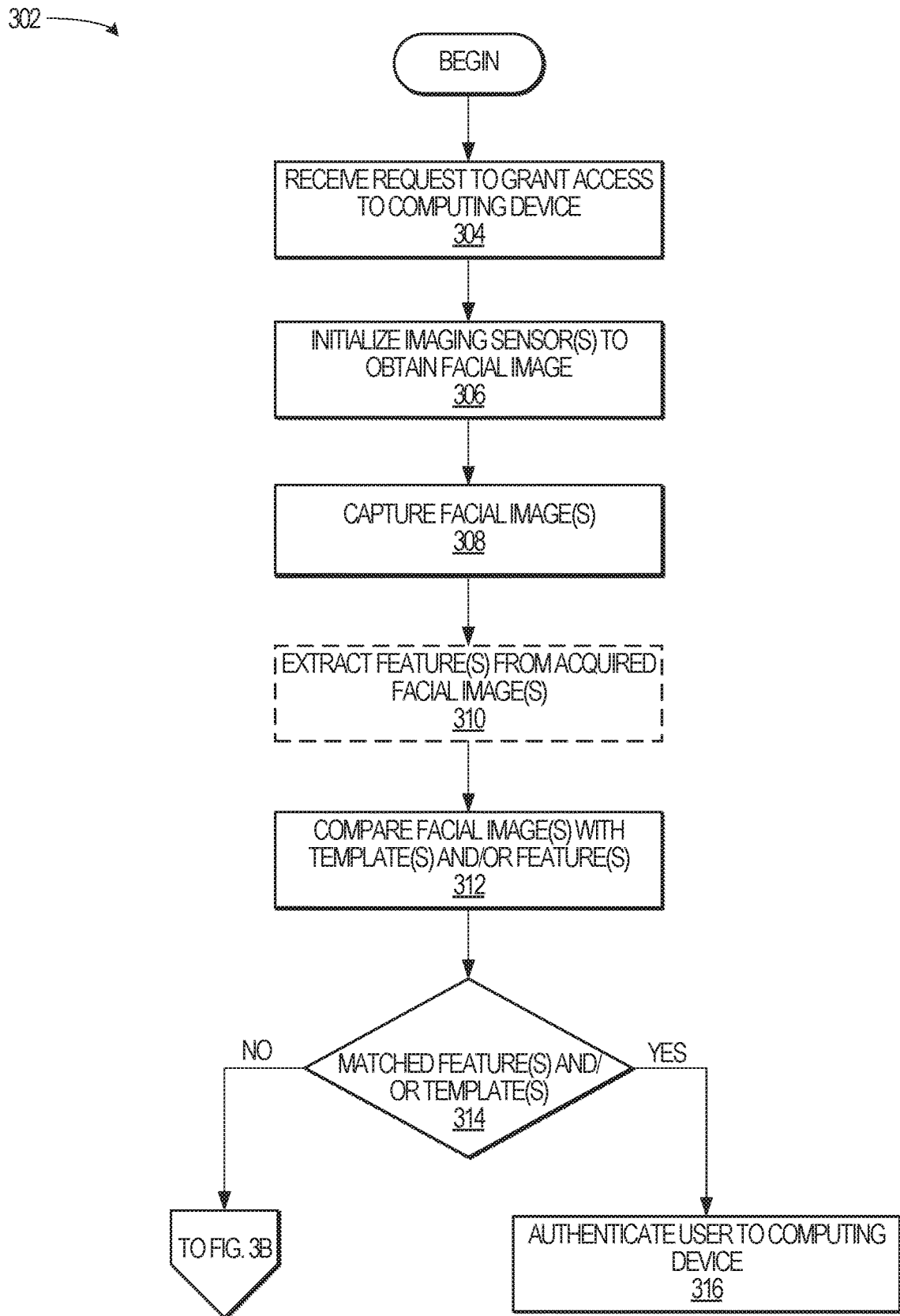
FIGS. 3A-3B illustrate a method, in accordance with an example embodiment, for generating transient image template from acquired image used in authenticating the user of FIG. 1 to the computing device of FIG. 1.
Figure 3B:
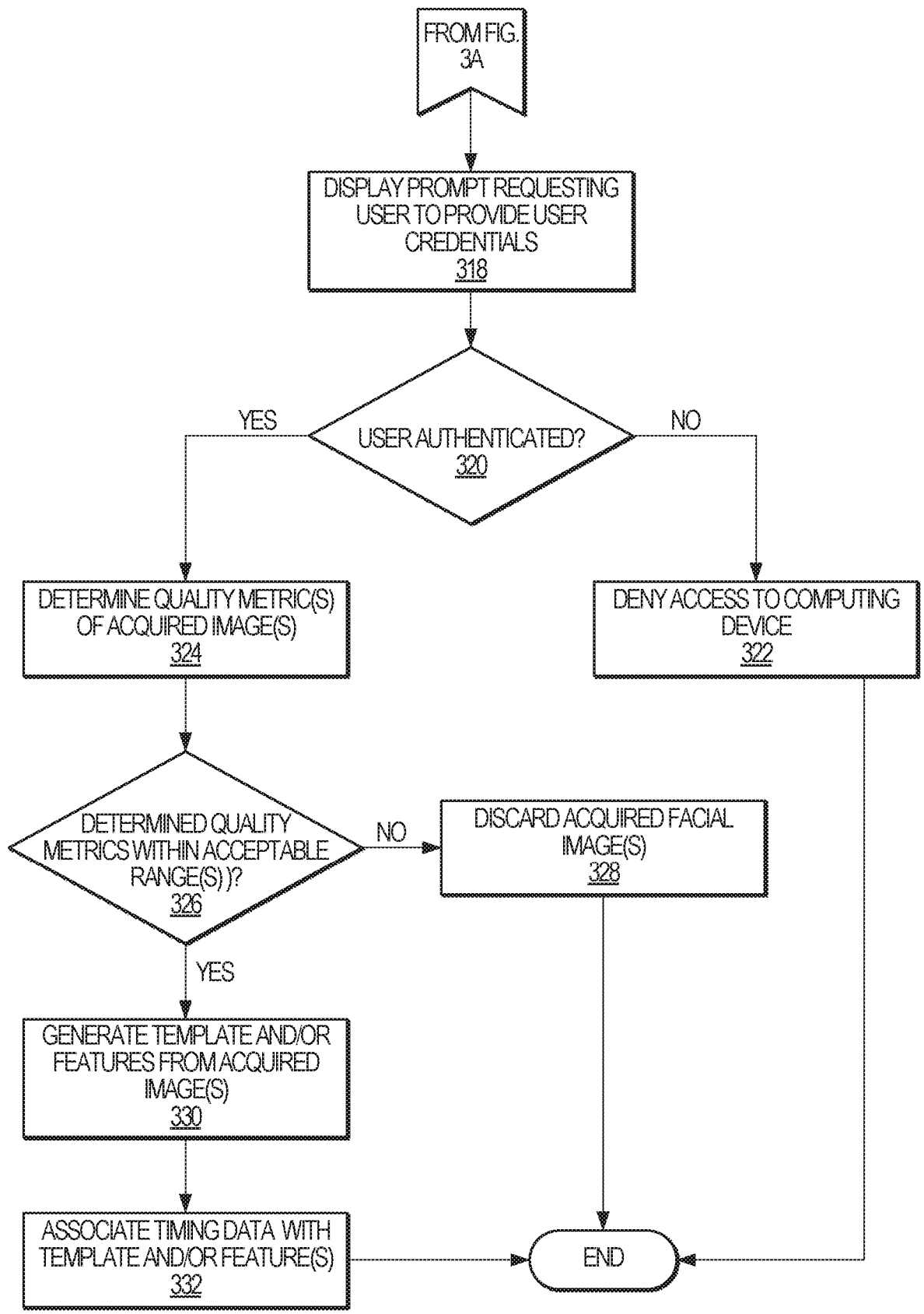

FIG. 3A-3B illustrate a method 302, in accordance with an example embodiment, for generating transient image template(s) 228 from acquired image(s) 222. The method 302 may be performed by one or more of the components illustrated in FIG. 2 and is discussed by way of reference thereto.

Initially, and with reference to FIGS. 2 and 3A, the computing device 106 receives, via the operating system 214, a request for access (Operation 304). The request for access may comprise a request to perform an image-based authentication of the user 104. The operating system 214 and/or the authentication application 216 then initializes one or more of the image sensor(s) 206 for acquiring one or more images of the user 104 (Operation 306). The image sensor(s) 206 then acquire the one or more images of the user 104 and store such image(s) as the acquired image(s) 222 (Operation 308). In some embodiments, the authentication application 216 and/or the facial recognition application 218 then determines one or more image feature(s) from the acquired image(s) 222 (Operation 310). Although shown as an optional operation, the Operation 310 may be performed alternatively and/or additionally to one or more of the operations shown in FIG. 3A.

The facial recognition application 218 then compares the acquired image(s) 222 with one or more of the baseline image template(s) 226 (Operation 312). As discussed above, the image template matching operations may include, but are not limited to, sum of squared difference, normalized sum of square differences, cross-correlation, normalized cross-correlation, correlation-coefficient, and other such template matching techniques or combinations thereof. Additionally and/or alternatively, the facial recognition application 218 performs one or more feature matching operations using baseline image feature(s) 232 and one or more features determined from the acquired image(s) 222 (Operation 312).

The facial recognition application 218 then informs or communicates an instruction to the authentication application 216 whether the one or more acquired image(s) 222 match the baseline image template(s) 226 (Operation 314). Where this determination is made in the affirmative (e.g., the "YES" branch of Operation 314), the method 302 proceeds to Operation 316 where the authentication application 216 confirms that the user 104 is authorized to access the computing device 106. Alternatively, where this determination is made in the negative (e.g., the "NO" branch of Operation 314), the method 302 proceeds to Operation 318 on FIG. 3B.

Referring to FIG. 3B, at Operation 318 the computing device 106, via the operating system 214, displays a prompt to the user 104 requesting that the user 104 authenticate himself or herself using a second means of authentication. For example, the operating system 214 may display a prompt requesting that the user 104 provide one or more user credentials, such as a PIN, secret pattern, username and password, fingerprint, or other such user credentials.

The provided user credentials are then compared with previously stored user credentials 238 (Operation 320). Where the authentication application 216 determines that the user 104 is not authenticated (e.g., the "NO" branch of Operation 320), the method 302 proceeds to Operation 322. At Operation 322, the authentication application 216 instructs the operating system 214 to deny the user 104 access to the computing device 106. The method 302 then ends and the user 104 may be prompted to re-authenticate himself or herself to the computing device 106.

Alternatively, where the user 104 is authenticated (e.g., the "YES" branch of Operation 320), the computing device 106 then performs several operations in preparing to store one or more of the acquired image(s) 222 as the one or more transient image template(s) 228. First, the authentication application 216 and/or facial recognition application 218 may determine whether one or more of the acquired image(s) 222 are of a requisite quality to become a transient image template. Otherwise, if the acquired image(s) 222 are not of the requisite quality, then it is likely that the user will be unable to authenticate himself or herself in future attempts where the low-quality acquired image(s) 222 are the transient image template(s) 228.

As discussed above, the authentication application 216 and/or the facial recognition application 218 determines various quality metrics of one or more of the acquired image(s) 222 (Operation 324). Examples of quality metrics include detected light levels (e.g., underexposure or overexposure), blurriness, whether one or more faces can be detected (e.g., object detection probability), and other such quality metrics or combinations thereof.

The authentication application 216 and/or the facial recognition application 218 then determines whether the determined and/or obtained quality metric values of the one or more acquired image(s) is within a predetermined range of acceptable quality metric values (e.g., at or above a lower threshold and at or below an upper threshold) (Operation 326). A range of quality metric values are used because, if one or more of the quality metrics are too high, such as an overexposure value, then the resulting image is likely overexposed and the image of the user 104 is likely obscured; similarly, if one or more of the quality metrics value is too low (e.g., the object detection probability, detected ambient light levels, etc.), then the resulting image is likely underexposed and/or darkened, and the image of the user 104 is likely to be indeterminable from shadows or other dark markings. Accordingly, where the determination of Operation 326 is made in the negative (e.g., the "NO" branch of Operation 326), the method 302 proceeds to Operation 328. At Operation 328, the acquired image having the unacceptable ambient light value is deleted or discarded.

Alternatively, where this determination is made in the affirmative (e.g., the "YES" branch of Operation 326), the method 302 proceeds to Operation 330, where the authentication application 216 and/or the facial recognition application 218 generates the transient image template(s) 228 from the acquired image. Additionally and/or alternatively, the authentication application 216 and/or the facial recognition application 218 may also determine one or more features from the acquired image that are to be used in future attempts of image-based authentication of the user 104. The authentication application 216 and/or the facial recognition application 218 then associates timing data 236 with the one or more transient image template(s) 228 and/or determined features, where the timing data 236 includes a timer that indicates a duration of time that the transient image template(s) 8 is to remain on the computing device 106. As discussed above, at the expiration of the timer, the transient image template determined features) associated with the tinier are deleted (or otherwise removed) from the computing device 106.

Figure 4A:
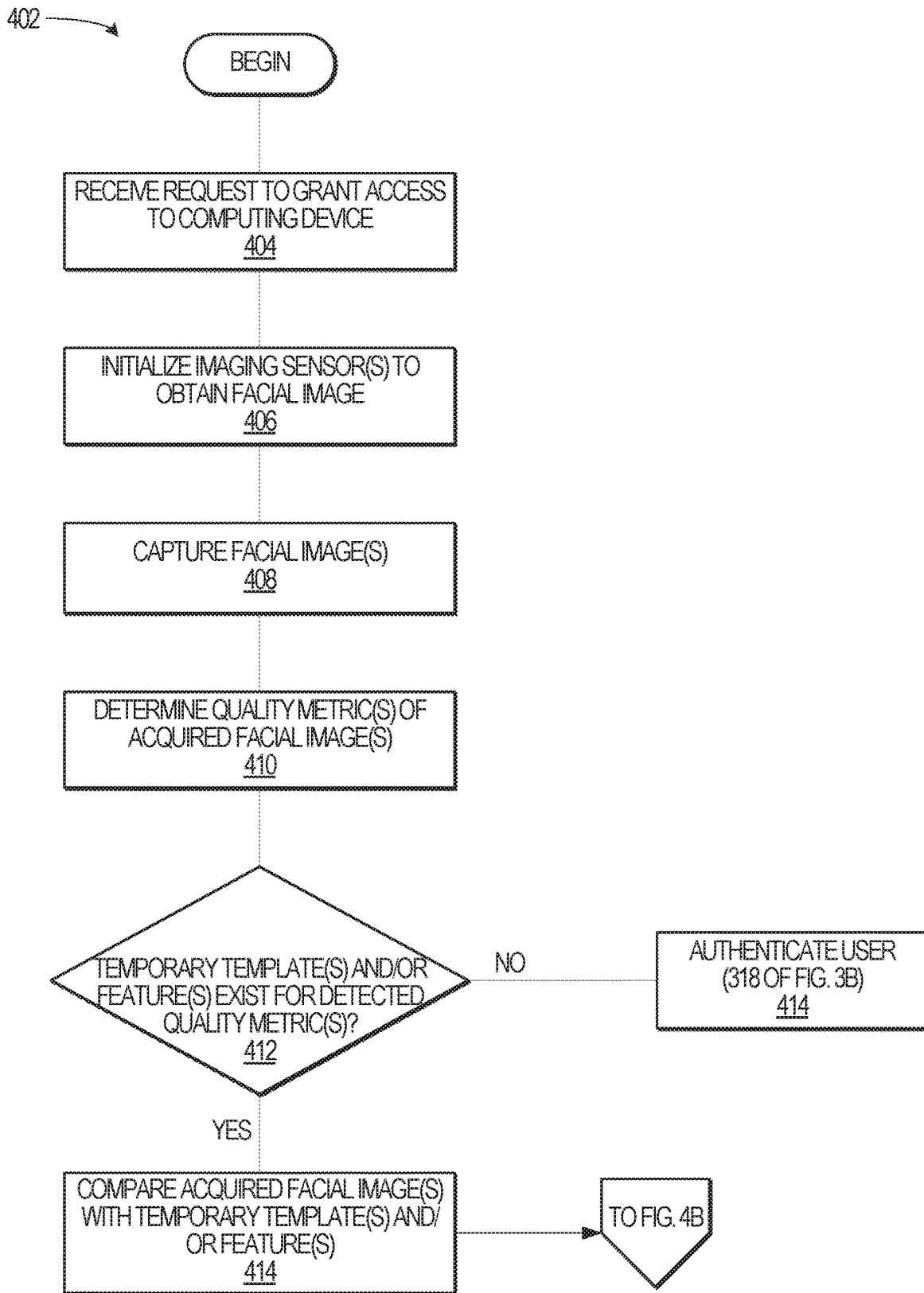
FIGS. 4A-4B illustrate a method, in accordance with an example embodiment, for authenticating the user to the computing device of FIG. 1 using one or more transient image templates.
Figure 4B:
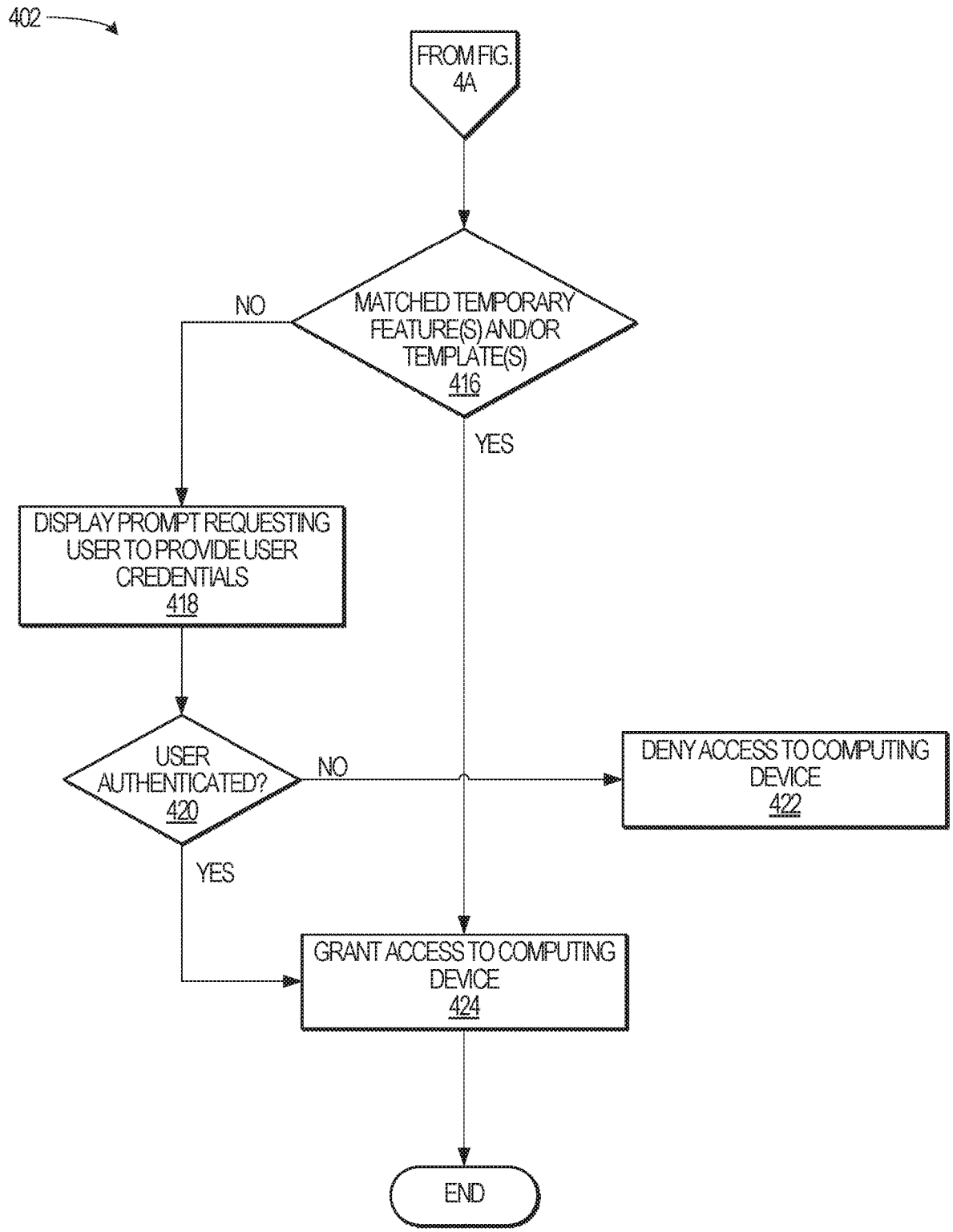

FIG. 4A-4B illustrate a method 402, in accordance with an example embodiment, for authenticating the user to the computing device of FIG. 1 using one or more transient image templates. The method 402 may be implemented by one or more of the components shown in HG. 2 and is discussed by way of reference thereto. The method 402 illustrates the operations that the computing device 106 undertakes after one.

Initially, and with reference to FIGS. 2 and 4A, the computing device 106 receives, via the operating system 214, a request for access (Operation 404). The request for access may comprise a request to perform an image-based authentication of the user 104. The operating system 214 and/or the authentication application 216 then initializes one or more of the image sensor(s) 206 for acquiring one or more images of the user 104 (Operation 406). The image sensor(s) 206 then acquire the one or more images of the user 104 and store such image(s) as the acquired image(s) 222 (Operation 408). In some embodiments, the authentication application 216 and/or the facial recognition application 218 then determines one or more image feature(s) from the acquired image(s) 222 (operation not shown).

The facial recognition application 218 then determines various quality metric values of the acquired image(s) 222 (Operation 410). As explained previously, the method 402 relates to the situation where transient image template(s) 228 already exist; thus, the facial recognition application 218 determines the quality metric values of the acquired image(s) 222 to ensure that there are corresponding transient image template(s) 228 for such determined quality metric values. In one embodiment, one or more of the transient image template(s) 228 are selected for matching with the one or more acquired image(s) 222 where the quality metric values of the acquired image(s) 222 are equal to, or within a predetermined range of, the quality metric values for the corresponding transient image template(s) 222. Additionally and/or alternatively, the facial recognition application 218 may reject those acquired image(s) 222 where the quality metric values of the acquired image(s) 222 are outside of a predetermined range of the quality metric values associated with the transient image template(s) 228.

Where the facial recognition application 218 determines that there are no transient image template(s) 228 having quality metric values similar to the quality metric values of the acquired image(s) 222, (e.g., the "NO" branch of Operation 412), the method 402 proceeds to Operation 414, where the computing device 106 authenticates the user 104 using the secondary means of authentication (e.g., Operation 318 of FIG. 3B). Additionally and/or alternatively, the method 402 may proceed to Operation 308 so that the computing device 106 can perform those operations that establish the transient image template(s) 228.

Alternatively, where the facial recognition application 218 determines that there are corresponding transient image template(s) 228 (e.g., the "YES" branch of Operation 412), the method 402 proceeds to Operation 414, where the facial recognition application 218 performs the template matching and/or feature matching operations described previously.

Referring to FIG. 4B, the facial recognition application 218 determines whether there are matching transient image template(s) 228 and/or transient features for the acquired image(s) 222 and/or determined image features of the acquired image(s) 222. Where the facial recognition application 218 determines that there is a match for at least one transient image template 228 and at least one of the acquired image(s) 222, (or a match between transient features and determined features) (e.g., the "YES" branch of Operation 416), the method 402 proceeds to Operation 424, where the facial recognition application 218 instructs or informs the authentication application 216 that the user 104 is authenticated. Accordingly, at Operation 424, the user 104 is granted access to the computing device 106.

Alternatively, where the facial recognition application 218 determines that there is not a sufficient match of at least one acquired image and at least one of the transient image template(s) 228 (e.g., the "NO" branch of Operation 416), the facial recognition application 218 informs the authentication application 216 of the failure. Accordingly, the authentication application 216 may then instruct the operating system 214 to display a prompt requesting that the user 104 provide one or more user credentials. When provided with the user credentials, the authentication application 216 then determines whether the user 104 is authenticated (e.g., by comparing the provided credentials with the user credentials 238) (Operation 420). Where the authentication application 216 determines that the user 104 is not authenticated (e.g., the "NO" branch of Operation 420), the method 402 proceeds to Operation 422, where the authentication application 216 and/or the operating system 214 denies the user 104 access to the computing device 106. In one embodiment, the computing device 106 then begins the authentication anew and requests that the user 104 authenticate himself or herself to the computing device 106.

Alternatively, where the authentication application 216 determines that the user 104 is authenticated (e.g., the "YES" branch of Operation 420), the method 402 proceeds to Operation 424, where the authentication application 216 instructs and/or informs the operating system 214 that the user 104 is authorized to use the computing device 106.

Figure 5A:
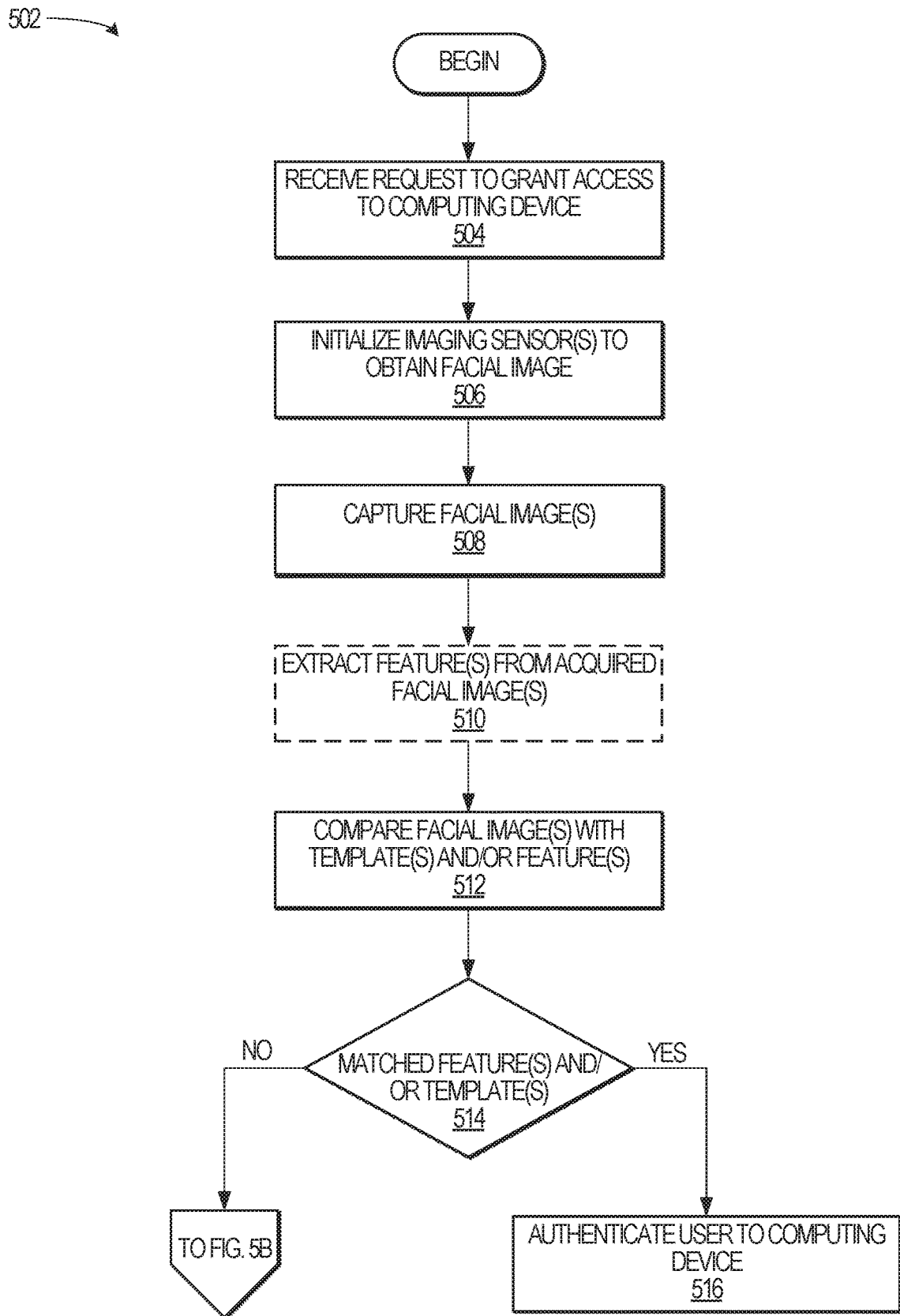
FIGS. 5A-5B illustrate a method, in accordance with an example embodiment, for generating transient image template(s) from acquired image(s), where the transient image template(s) are to be associated with a corresponding authenticated location.
Figure 5B:
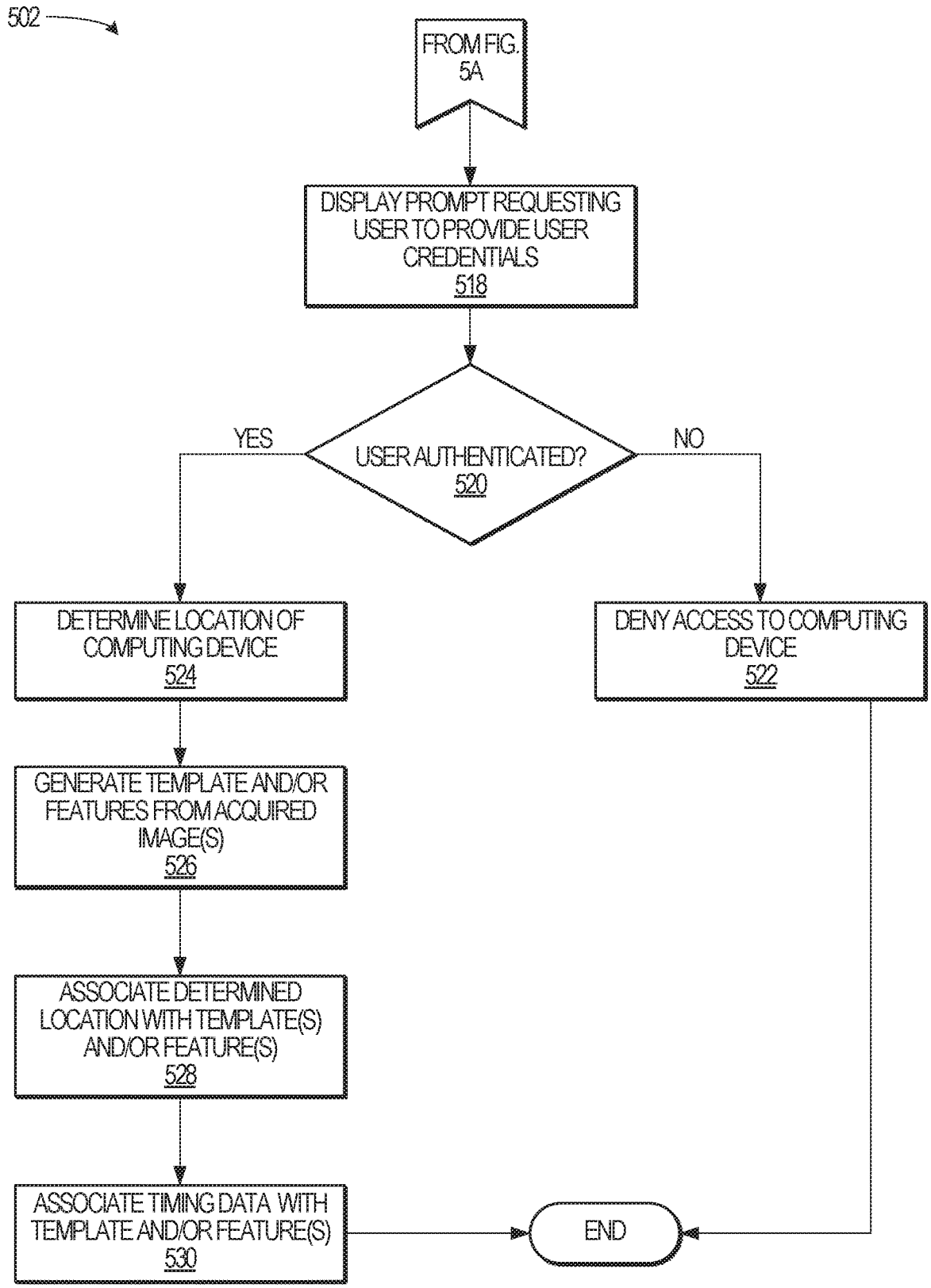

FIG. 5A-5B illustrate a method 502, in accordance with an example embodiment, for generating transient image template(s) 228 from acquired image(s) 222, where the transient image template(s) 228 are to be associated with a corresponding authenticated location. The method 502 may be performed by one or more of the components illustrated in FIG. 2 and is discussed by way of reference thereto.

Initially, and with reference to FIGS. 2 and 5A, the computing device 106 receives, via the operating system 214, a request for access (Operation 504). The request for access may comprise a request to perform an image-based authentication of the user 104. The operating system 214 and/or the authentication application 216 then initializes one or more of the image sensor(s) 206 for acquiring one or more images of the user 104 (Operation 506), The image sensor(s) 206 then acquire the one or more images of the user 104 and store such image(s) as the acquired image(s) 222 (Operation 508). In some embodiments, the authentication application 216 and/or the facial recognition application 218 then determines one or more image feature(s) from the acquired image(s) 222 (Operation 510). Although shown as an optional operation, the Operation MO may be performed alternatively and/or additionally to one or more of the operations shown in FIG. 5A.

The facial recognition application 218 then compares the acquired image(s) 222 with one or more of the baseline image template(s) 226 (Operation 512). As discussed above, the image template matching operations may include, but are not limited to, sum of squared difference, normalized sum of square differences, cross-correlation, normalized cross-correlation, correlation-coefficient, and other such template matching techniques or combinations thereof. Additionally and/or alternatively, the facial recognition application 218 performs one or more feature matching operations using baseline image feature(s) 232 and one or more features determined from the acquired image(s) 222 (Operation 512).

The facial recognition application 218 then informs or communicates an instruction to the authentication application 216 whether the one or more acquired image(s) 222 match the baseline image template(s) 226 (Operation 514). Where this determination is made in the affirmative (e.g., the "YES" branch of Operation 514), the method 502 proceeds to Operation 516 where the authentication application 216 confirms that the user 104 is authorized to access the computing device 106. Alternatively, where this determination is made in the negative (e.g., the "NO" branch of Operation 514), the method 302 proceeds to Operation 518 on FIG. 5B.

Referring to FIG. 5B, at Operation 518 the computing device 106, via the operating system 214, displays a prompt to the user 104 requesting that the user 104 authenticate himself or herself using a second means of authentication. For example, the operating system 214 may display a prompt requesting that the user 104 provide one or more user credentials, such as a PIN, secret pattern, username and password, fingerprint, or other such user credentials.

The provided user credentials are then compared with previously stored user credentials 238 (Operation 520), Where the authentication application 216 determines that the user 104 is not authenticated (e.g., the "NO" branch of Operation 520), the method 502 proceeds to Operation 522. At Operation 522, the authentication application 216 instructs the operating system 214 to deny the user 104 access to the computing device 106. The method 502 then ends and the user 104 may be prompted to re-authenticate himself or herself to the computing device 106.

Alternatively, where the user 104 is authenticated (e.g., the "YES" branch of Operation 520), the computing device 106 then performs several operations in preparing to store one or more of the acquired image(s) 222 as the one or more transient image template(s) 228. First, the authentication application 216 and/or facial recognition application 218 may determine a location of the computing device 106 (Operation 524). In one embodiment, the authentication application 216 and/or the facial recognition application 218 queries the GPS transceiver 208 to obtain a GPS location 224 of the computing device 106. However, and as explained previously, the location of the computing device 106 may be determined according to other technologies, such as cellular triangulation, IP address geolocation, WiPS/WFPS, and other such technologies or combinations thereof.

As the user 104 has authenticated himself or herself, this indicates to the authentication application 216 and/or facial recognition application 218 that the UPS location 224 (or location determined using other geolocation technologies) of the computing device 106 is a trusted location. Accordingly, the authentication application 216 and/or the facial recognition application 218 may store the GPS location 224 as an authenticated GPS location 230.

In addition, and as discussed with reference to FIGS. 3A-3B, the facial recognition application 218 may determine whether the acquired image(s) are sufficient for performing the matching and/or comparison operations including, but not limited to, determining ambient light levels in the acquired image(s), determining blurriness of the acquired image(s), determining color levels in the acquired image(s) (e.g., through a histogram analysis), and other such determinations. Accordingly, in this manner, the facial recognition application 218 determines whether the acquired image(s) 222 have a requisite quality for performing image-based authentication.

Based on whether one or more of the acquired image(s) 222 is sufficient for performing image-based authentication, the authentication application 216 and/or the facial recognition application 218 may then generate a transient image template 228 and/or transient image features from the one or more acquired image(s) 222 (Operation 526). Thereafter, the authentication application 216 and/or the facial recognition application 218 then establishes an association between the authenticated GPS location 230 and the transient image template 228, such as by storing the association in a two-dimensional table or other relational database (not shown), In addition, and in similar manner to the method 302, the authentication application 216 and/or the facial recognition application 218 then associates timing data 236 with the one or more transient image template(s) 228 and/or determined features, where the timing data 236 includes a timer that indicates a duration of time that the transient image template(s) 228 is to remain on the computing device 106. As discussed above, at the expiration of the timer, the transient image template (or determined features) associated with the timer are deleted (or otherwise removed) from the computing device 106.

Thus, in addition to including timing data 236 with one or more of the transient image template(s) 228, the authentication application 216 and/or the facial recognition application 218 also associates an authenticated GPS location 230 with one or more of the transient image template(s) 228. Accordingly, each of the transient image template(s) 228 may be associated with an authenticated GPS location 230 and timing data 236. These associations further improve the functioning of the computing device 106 because they allow the computing device 106 to authenticate the user 104 based both on time (e.g., whether the timer associated with a transient image template 228 has expired) and on location (e.g., whether the computing device 106 is located at a location that the user 104 has previously authenticated).

Figure 6A:
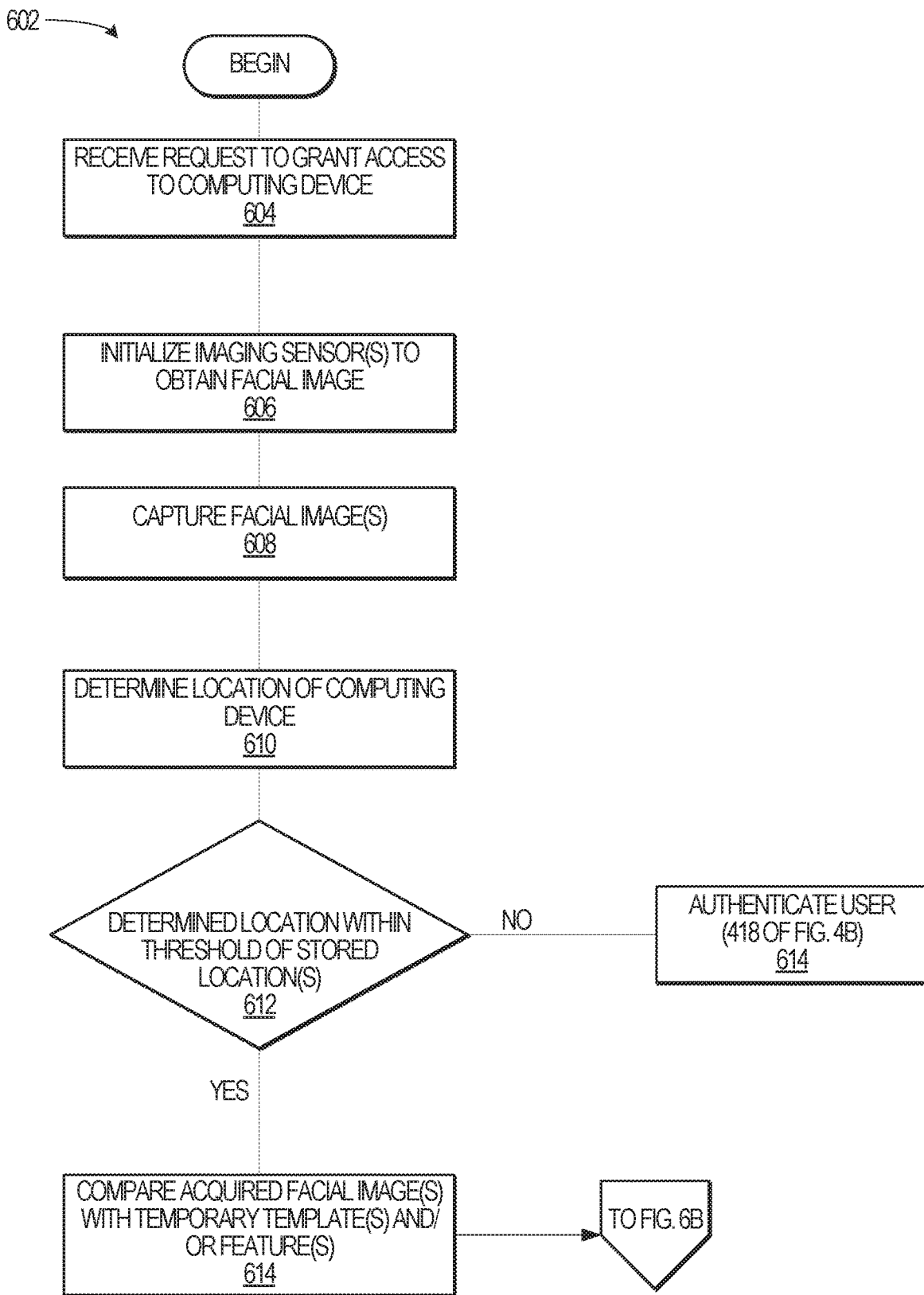
FIGS. 6A-6B illustrate a method, in accordance with an example embodiment, for authenticating the user to the computing device of FIG. 1 using one or more transient image template(s) and authenticated GPS location(s).
Figure 6B:
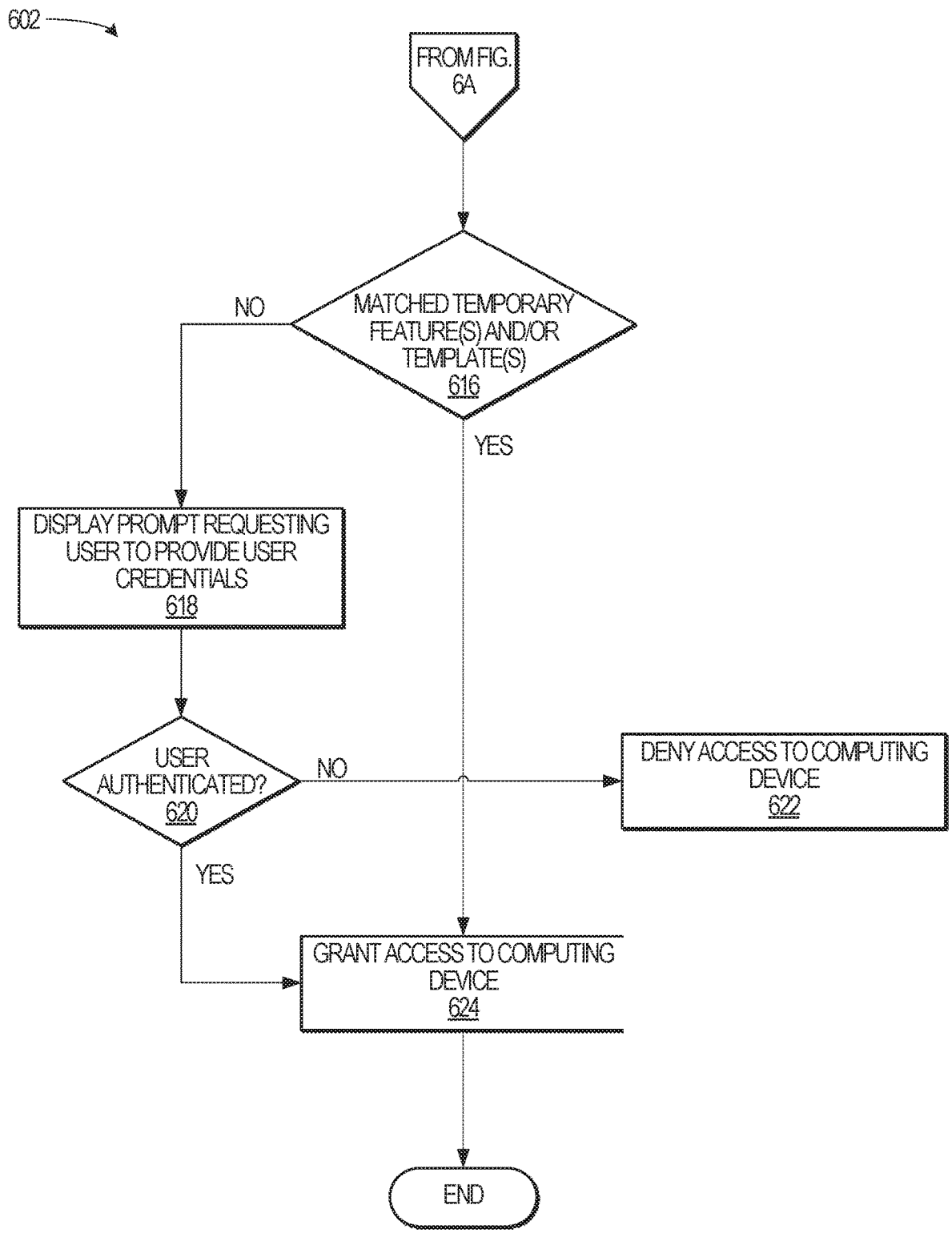

FIG. 6A-6B illustrate a method 602, in accordance with an example embodiment, for authenticating the user 104 to the computing device 106 using one or more transient image template(s) 228 and the authenticated GPS location(s) 230. The method 602 may be implemented by one or more of the components shown in FIG. 2 and is discussed by way of reference thereto.

Initially, and with reference to FIGS. 2 and 6A, the computing device 106 receives, via the operating system 214, a request for access (Operation 604). The request for access may comprise a request to perform an image-based authentication of the user 104. The operating system 214 and/or the authentication application 216 then initializes one or more of the image sensor(s) 206 for acquiring one or more images of the user 104 (Operation 606). The image sensor(s) 206 then acquire the one or more images of the user 104 and store such image(s) as the acquired image(s) 222 (Operation 608). In some embodiments, the authentication application 216 and/or the facial recognition application 218 then determines one or more image feature(s) from the acquired image(s) 222 (operation not shown).

The authentication application 216 and/or the facial recognition application 218 then determines the location of the computing device 106 (Operation 610). In one embodiment, the GPS transceiver 208 provides the GPS location 224 of the computing device 106. As explained previously, the method 602 relates to the situation where transient image template(s) 228 already exist and are associated with one or more authenticated GPS location(s) 230; thus, the authentication application 216 and/or the facial recognition application 218 obtains the location of the computing device 106 to determine whether there is a corresponding transient image template associated with a GPS location equal to, or approximately equal to, the GPS location 224 of the computing device 106.

Accordingly, using the GPS location 224, the authentication application 216 and/or the facial recognition application 218 determines whether there is an authenticated GPS location 230 approximate, or near, the GPS location 224. In one embodiment, the computing device 106 is programmed with a distance threshold, which indicates a threshold distance in which the GPS location 224 should be at or within to an authenticated GPS location 230 to be considered at or near the authenticated GPS location 230. Where the authentication application 216 and/or the facial recognition application 218 is unable to identify a corresponding authenticated GPS location (e.g., the "NO" branch of Operation 612), the method 602 proceeds to Operation 614. At Operation 614, the computing device 106 authenticates the user 104 using the secondary means of authentication (e.g., Operation 518 of FIG. 5B). Additionally, and/or alternatively, the method 402 may proceed to Operation 508 so that the computing device 106 can perform those operations that establish the transient image template(s) 228 and the associations between the transient image template(s) and the authenticated GPS location(s) 230.

Alternatively, where the authentication application 216 and/or the facial recognition application 218 determines that there are one or more authenticated GPS location(s) 230 corresponding to the GPS location 224 (e.g., the "YES" branch of Operation 612), the method 602 proceeds to Operation 614. At Operation 614, the facial recognition application 218 references the template/GPS associations 234 using the determined authenticated GPS location(s) 230 of Operation 612 to identify the corresponding transient image template(s) 228. Using the corresponding transient image template(s) 228, the facial recognition application 218 then compares the corresponding transient image template(s) with the one or more acquired image(s) 222.

Referring to FIG. 6B, the facial recognition application 218 determines whether there are matching transient image template(s) 228 and/or transient features for the acquired image(s) 222 and/or determined image features of the acquired image(s) 222 (Operation 616). Where the facial recognition application 218 determines that there is a match for at least one transient image template 228 and at least one of the acquired image(s) 222, (or a match between transient features and determined features) (e.g., the "YES" branch of Operation 616), the method 602 proceeds to Operation 624, where the facial recognition application 218 instructs or informs the authentication application 216 that the user 104 is authenticated. Accordingly, at Operation 624, the user 104 is granted access to the computing device 106.

Alternatively, where the facial recognition application 218 determines that there is not a sufficient match of at least one acquired image and at least one of the transient image template(s) 228 (e.g., the "NO" branch of Operation 616), the facial recognition application 218 informs the authentication application 216 of the failure. Accordingly, the authentication application 216 may then instruct the operating system 214 to display a prompt requesting that the user 104 provide one or more user credentials. When provided with the user credentials, the authentication application 216 then determines whether the user 104 is authenticated (e.g., by comparing the provided credentials with the user credentials 238) (Operation 620). Where the authentication application 216 determines that the user 104 is not authenticated (e.g., the "NO" branch of Operation 620), the method 602 proceeds to Operation 622, where the authentication application 216 and/or the operating system 214 denies the user 104 access to the computing device 106. In one embodiment, the computing device 106 then begins the authentication anew and requests that the user 104 authenticate himself or herself to the computing device 106.

Alternatively, where the authentication application 216 determines that the user 104 is authenticated (e.g., the "YES" branch of Operation 620), the method 602 proceeds to Operation 624, where the authentication application 216 instructs and/or informs the operating system 214 that the user 104 is authorized to use the computing device 106.

Figure 7A:
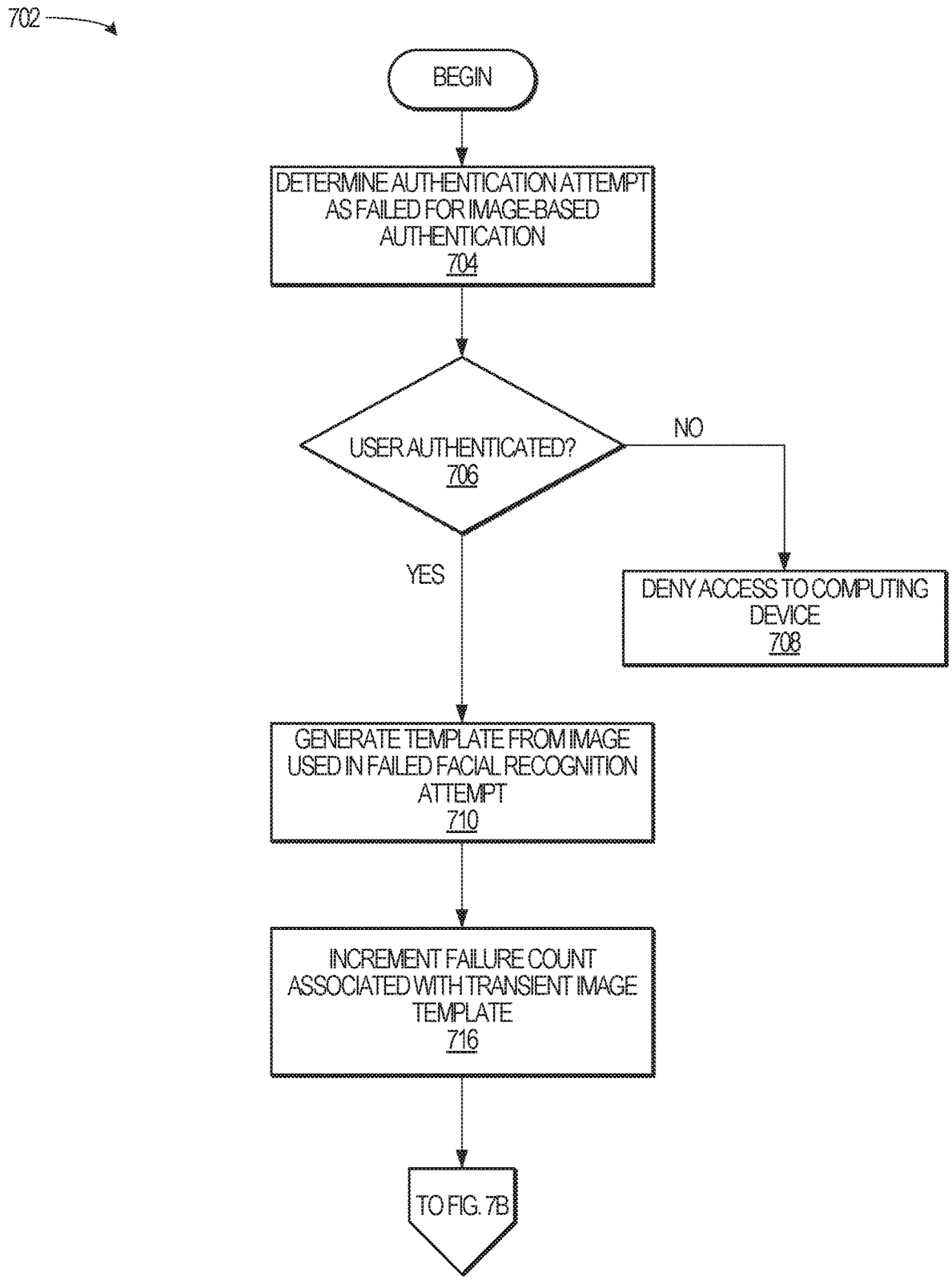
FIGS. 7A-7B illustrate a method, in accordance with an example embodiment, for modifying one or more baseline image templates when a predetermined number of transient image templates have been generated.
Figure 7B:
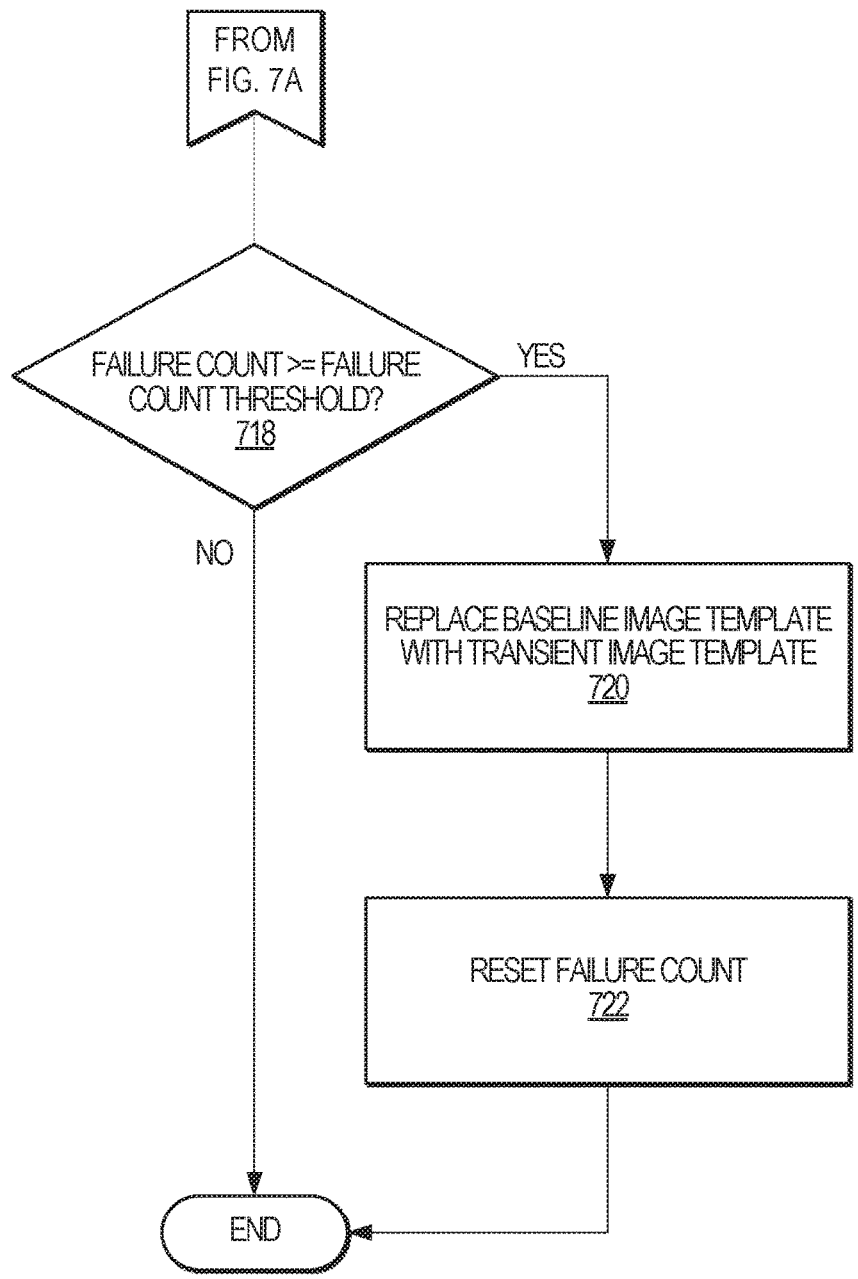

FIG. 7A-7B illustrate a method 702, in accordance with an example embodiment, for modifying one or more baseline image template(s) 226 when a predetermined number of transient image template(s) 228 have been generated. The method 702 may be implemented by one or more components of FIG. 2 and is discussed by way of reference thereto.

The focus of method 702 is on determining whether there have been prior image-based authentication failures within a predetermined time period and/or at a particular location. Each time an image-based authentication failure occurs, a failure count is incremented and, when the failure count meets or exceeds a failure count threshold, the authentication application 216 and/or the facial recognition application 218 then modifies and/or replaces the baseline image template with the transient image template.

To expedite a description of method 702, the method 702 is illustrated at a point where an initial image-based facial recognition has failed (Operation 704). For clarity purposes, the operations preceding Operation 704 may correspond to Operations 304-320 of FIGS. 3A-3B and/or Operations 504-520 of FIGS. 5A-5B (e.g., where the user 104 has attempted to authenticate himself or herself using the facial recognition methods disclosed herein).

Referring to FIG. 7A and FIG. 2, at Operation 706, the facial recognition application 218 determines whether the user 104 is authorized to access computing device 106 by comparing user provided credentials (e.g., provided at or about the time the image-based facial recognition failed) with previously stored user credentials 238. Where the comparison fails and the user-provided credentials are not a match for the previously stored user credentials 238 (e.g., the "NO" branch of Operation 706), the facial recognition application 218 informs and/or instructs the authentication application 216 of the failure. Accordingly, the authentication application 216 may then instruct the operating 214 to deny the user 104 access to the computing device 106 (Operation 708).

Alternatively, where the user 104 is authenticated (e.g., the "YES" branch of Operation 706), the method 702 proceeds to Operation 710 where the authentication application 216 and/or the facial recognition application 218 generates a transient image template from the acquired image that resulted in the image-based authentication failure.

The authentication application 216 and/or the facial recognition application 218 then increments a failure count. The failure count may be associated with a particular location (e.g., one or more of the authentication GPS location(s) 230) or may be associated with a predetermined time period. In various instances, the failure count may be initialized to a zero value upon a predetermined condition being met, such as the computing device 106 arriving at the particular location after being away from the particular location for a predetermined amount of time, after a second predetermined time period has elapsed without an image-based authentication failure occurring (e.g., indicating that the environment is conducive to image-based authentication), and/or, as discussed below, when a transient image template is converted to a baseline image template. Depending on the manner in which the computing device 106 implements the failure count, each of the authenticated GPS location(s) 230 may be associated with a failure count, where the failure count value is a zero or non-zero value.

Referring to FIG. 7B, the authentication application 216 and/or the facial recognition application 218 then determines whether the failure count meets or exceeds a predetermined failure count threshold (Operation 718), In one embodiment, each of the authenticated GPS location(s) 230 is associated with a corresponding failure count threshold such that the failure count value for an authenticated GPS location is compared with its corresponding failure count threshold. The failure count threshold may be non-configurable and preconfigured for the computing device 106. Alternatively, the failure count threshold may be configurable by the user 104 such that the user 104 may provide an input that establishes a value for the failure count threshold, such as when an acquired image 222 is converted to a transient image template 228.

Where the failure count value does not meet or exceed the failure count threshold value (e.g., the "NO" branch of Operation 718), the method 702 terminates with respect to determining whether the baseline image template should be replaced or permanently supplemented. Alternatively, where the failure count value does meet or exceed the failure count threshold value (e.g., the "YES" branch of Operation 718), the method 702 proceeds to Operation 720, where the baseline image template is replaced with the transient image template used in the image-based authentication process (Operation 720). In some instances, replacing the baseline image template comprises with the transient image template comprises replacing a global or universal baseline image template with the transient image template. In other instances, replacing the baseline image template comprises replacing a baseline image template associated with a particular location with the transient image template. In yet further instances, the computing device 106 may maintain a predetermined number of transient image template(s) from prior image-based authentication failures and, when the failure count value meets or exceeds the failure count threshold value, replacing the baseline image template may comprise computing an average image template from the collection of transient image templates, and replacing the baseline image template with the averaged image template.

Having replaced the baseline image template with the transient image template (or an averaged transient image template), the authentication application 216 and/or the facial recognition application 218 then resets the failure count a global failure count or a failure count associated with a particular location). The method 702 then terminates with respect to determining whether the baseline image template should be replaced or modified.

Figure 8:
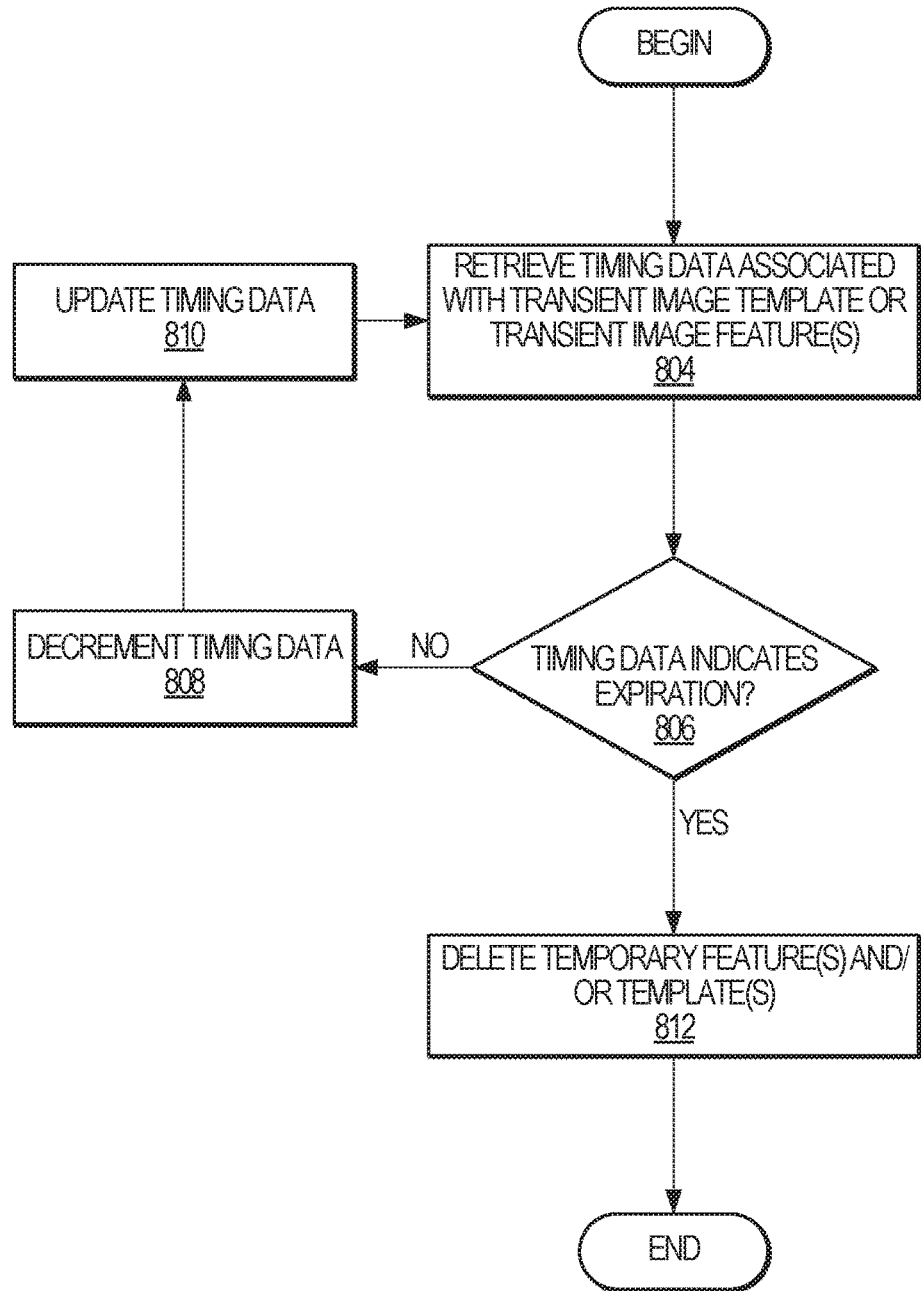
FIG. 8 illustrates a method, in accordance with an example embodiment, of implementing a timer for the transient image template(s) of the computing device of FIG. 1.

FIG. 8 illustrates a method 802, in accordance with an example embodiment, for updating the timing data for one or more transient image templates. The method 802 may be implemented by one or more of the components shown in FIG. 2 and is discussed by way of reference thereto.

Initially, the authentication application 216 retrieves timing data 236 associated with a transient image template 228 or one or more transient image features (Operation 804). In one embodiment, the timing data 236 comprises a timer that indicates the amount of remaining time a transient image template 228 or a transient image feature has before the authentication application 216 and/or facial recognition application 216 deletes the transient image template 228 or the transient image feature from the computing device 106. Alternatively, the timer may indicate the amount of time the transient image template 228 or the transient image feature has resided on the computing device 106.

The authentication application 216 and/or the facial recognition application 218 then determines whether the timing data 236 associated with the transient image template or the one or more transient image features has expired. (Operation 806). In one embodiment, determining whether the timer has expired comprises determining whether the timer has reached a zero value. Alternatively, determining whether the timer has expired comprises comparing the timer with a predetermined timer threshold; where the timer meets or exceeds the predetermined tinier threshold, the authentication application 216 and/or the facial recognition application 218 determines that the timer has expired.

Where the authentication application 216 and/or the facial recognition application 218 determines that the timing data 236 does not indicate that it has expired (e.g., the "NO" branch of Operation 806), the method 802 proceeds to Operation 808. At Operation 808, the authentication application 216 and/or the facial recognition application 218 adjusts the timing data 236; as shown in FIG. 8, adjusting the timing data 236 may include decrementing the timing data 236 by a predetermined amount one second). In another embodiment, adjusting the timing data 236 may include incrementing the timing data 236 by the predetermined amount. The timing data 236 associated with the transient image template and/or one or more transient image features is then updated with the new decremented (or incremented)

timing value (Operation 810). The method 802 then returns to Operation 804, where the method begins again.

Referring back to Operation 806, where the authentication application 216 and/or the facial recognition application 218 determines that the timing data 236 indicates that a timer associated with the transient image template and/or transient image features has expired (e.g., the "YES" branch of Operation 806), the method 802 proceeds to Operation 912. At Operation 812, the authentication application 216 and/or the facial recognition application 218 deletes, or otherwise removes, the transient image template or the one or more transient image features from the computing device 106. The method 802 may then end for that particular timing data.

Although the methods 302-802 are shown independently, one of ordinary skill in the art will appreciate that the operations of methods 302-802 may be reordered and/or rearranged in various combinations, where duplicate or redundant Operations are omitted. Thus, the methods disclosed herein are not solely limited to their specific implementations as shown in FIGS. 3-8, but may be arranged or combined in any logical or operative fashion.

In this manner, this disclosure provides for various embodiments relating to image-based authentication of the user 104 and, in particular, to establishing a transient image template after an image-based authentication has failed but the user 104 has authenticated himself or herself using a second means of authentication. By using transient image templates and/or transient image features, the computing device 106 can perform image-based authentication in environments where image-based authentication consistently or typically fails with a baseline image template and/or baseline image features. In this regard, this disclosure provides for a technical improvement in the manner in which image-based authentication is conventionally performed; thus, the functioning and operations of the computing device 106 is improved over conventionally implemented computing devices.

Modules, Components, and Logic

Certain embodiments are described herein as including logic or a number of components, modules, or mechanisms. Modules may constitute either software modules (e.g., code embodied on a machine-readable medium or machine-readable storage device) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a FPGA or an ASIC. A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things" while yet another combination produces a server computer for use within a cloud computing architecture. Nat all combinations of such software and hardware architectures are presented here as those of skill in the art can readily understand how to implement the inventive subject matter in different contexts from the disclosure contained herein.

Example Machine Architecture and Machine-Readable Medium

Figure 9:
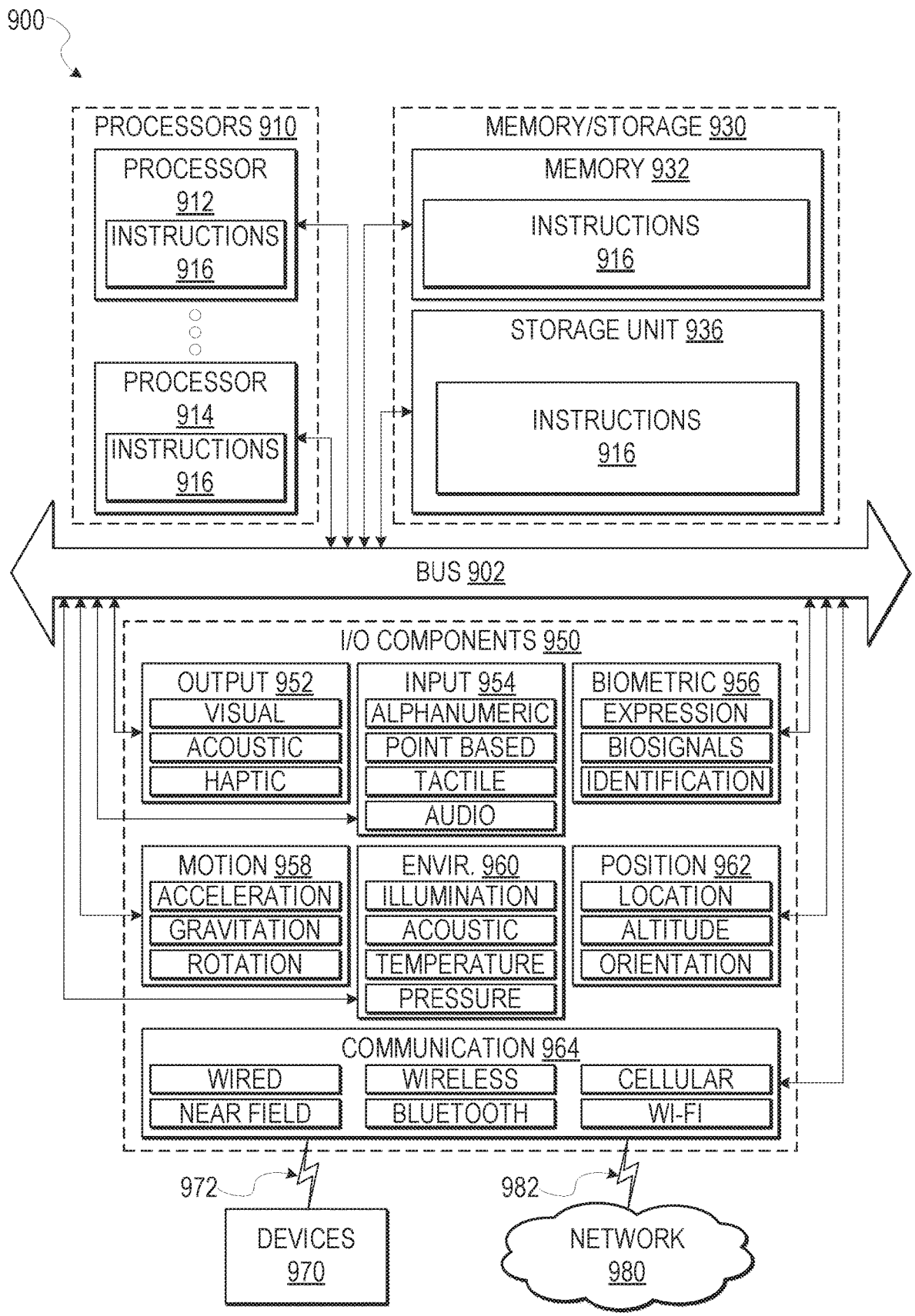
FIG. 9 is a block diagram illustrating components of a machine, according to some example embodiments, able to read instructions from a machine-readable medium (e.g., a machine-readable storage medium or machine-readable storage device) and perform any one or more of the methodologies discussed herein.

FIG. 9 is a block diagram illustrating components of a machine 900, according to some example embodiments, able to read instructions from a machine-readable medium (e.g., a machine-readable storage medium or machine-readable storage device) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods illustrated in FIGS. 3A-8. Additionally, or alternatively, the instructions 916 may implement one or more of the components of FIGS. 1-2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a PDA, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (WIC), another processor, or any suitable combination thereof) may include, for example, processor 912 and processor 914 that may execute the instructions 916. The term "processor" is intended to include multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof during execution thereof by the machine 900. Accordingly, the memory 932, the storage unit 936, and the memory of processors 910 are examples of machine-readable media.

As used herein, "machine-readable medium" includes a machine-readable storage device able to store instructions 916 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/I) components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972, respectively. For example, the communication components 964 may include a network interface component or other suitable device to interface with the network 980. In further examples, communication components 964 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via. Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1 xRTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A method for accessing a computer device, the method comprising:
   acquiring a first image with a computing device;
   comparing the first image with a first image template to determine whether a person corresponding to the first image is authorized to use the computing device;
   displaying a request for user credentials to authenticate the user based on the comparison of the first image and the first image template;
   receiving the user credentials;
   storing the first image as a second image template based on a determination that the user credentials authorizes the user to use the computing device;
   associating the second image template with a geographic location to enable use of the second image template to authenticate the user based on the geographic location;
   acquiring a second image with the computing device;
   determining that the computing device is within a threshold distance of the geographic location;
   responsive to the determination that the computing device is within the threshold distance, comparing the second image with the second image template to determine whether the user is authorized to use the computing device; and
   granting access to the computing device based on the comparison of the second image and the second image template.

2. The method of claim 1, further comprising:
   evaluating the geographic location;
   deleting the second image template in response to the evaluation of the geographic location; and
   designating the first image template for use in authorizing the user after deleting the second image template.

3. The method of claim 2,
   wherein
   deleting the second image template comprises deleting the second image template in response to a determination that the computing device exceeds the threshold distance of the geographic location.

4. The method of claim 1, wherein the location is associated with the second image template in response to the user being authenticated by the user credentials.

5. The method of claim 1, further comprising:
   determining an ambient light level associated with the first image; and wherein storing the first image as the second image template further comprises:
   comparing the ambient light level with an ambient light level threshold; and
   storing the first image as the second image template in response to a determination that the ambient light level exceeds the ambient light level threshold.

6. The method of claim 1, wherein:
   the comparison of the first image with the first image template results in an image-based authentication failure; and
   the user credentials authorize the user after the image-based authentication failure; and the method further comprises:
   incrementing a failure count value in response to the image-based authentication failure;
   determining whether the failure count value exceeds a failure count threshold value; and
   replacing the first image template with the second image template such that the first image template is no longer used for image-based authentication.

7. A system for accessing a computer device, the system comprising:
   a computer-readable storage device having computer-executable instructions stored thereon; and
   one or more hardware processors communicatively coupled to the computer-readable storage device that, having executed the computer-executable instructions, configure the system to:
   acquire a first image with a computing device;
   compare the first image with a first image template to determine whether a person corresponding to the first image is authorized to use the computing device;
   display a request for user credentials to authenticate the user based on the comparison of the first image and the first image template;

receive the user credentials;

store the first image as a second image template based on a determination that the user credentials authorizes the user to use the computing device;

associate the second image template with a geographic location to enable use of the second image template to authenticate the user based on the geographic location;

acquire a second image with the computing device;

determine that the computing device is within a threshold distance of the geographic location;

responsive to the determination that the computing device is within the threshold distance, compare the second image with the second image template to determine whether the user is authorized to use the computing device; and grant access to the computing device based on the comparison of the second image and the second image template.

8. The system of claim 7, wherein the system is further configured to:

evaluate the geographic location;

delete the second image template in response to the evaluation of the geographic location; and designate the first image template for use in authorizing the user after deleting the second image template.

9. The system of claim 8, wherein deleting the second image template comprises deleting the second image template in response to a determination that the computing device exceeds the threshold distance of the geographic location.

10. The system of claim 7, wherein the location is associated with the second image template in response to the user being authenticated by the user credentials.

11. The system of claim 7, wherein the system is further configured to:

determine an ambient light level associated with the first image; and wherein the storage of the first image as the second image template comprises:

comparing the ambient light level with an ambient light level threshold; and storing the first image as the second image template in response to a determination that the ambient light level exceeds the ambient light level threshold.

12. The system of claim of claim 7, wherein:

the comparison of the first image with the first image template results in an image-based authentication failure; and the user credentials authorize the user after the image-based authentication failure; and the system is further configured to:

increment a failure count value in response to the image-based authentication failure;

determine whether the failure count value exceeds a failure count threshold value; and replace the first image template with the second image template such that the first image template is no longer used for image-based authentication.

13. A system for accessing a computer device, the system comprising:

means for acquiring a first image with a computing device;

means for comparing the first image with a first image template to determine whether a person corresponding to the first image is authorized to use the computing device;

means for displaying a request for user credentials to authenticate the user based on the comparison of the first image and the first image template;

means for receiving the user credentials;

means for storing the first image as a second image template based on a determination that the user credentials authorizes the user to use the computing device;

means for associating the second image template with a geographic location to enable use of the second image template to authenticate the user based on the geographic location;

means for acquiring a second image with the computing device;

means for determining that the computing device is within the threshold distance;

means for comparing the second image with the second image template to determine whether the user is authorized to use the computing device responsive to determining that the computing device is within the threshold distance; and means for granting access to the computing device based on the comparison of the second image and the second image template.

14. The system of claim 13, further comprising:

means for evaluating the geographic location;

means for deleting the second image template in response to the evaluation of the predetermined condition; and means for designating the first image template for use in authorizing the user after deleting the second image template.

15. The system of claim 14, wherein the means for deleting the second image template perform the deletion by deleting the second image template in response to a determination that the computing device exceeds the threshold distance of the geographic location.

16. The system of claim 13, wherein the system further comprises:

means for determining an ambient light level associated with the first image; and wherein the means for storing the first image as the second image template perform the storage by:

comparing the ambient light level with an ambient light level threshold; and storing the first image as the second image template in response to a determination that the ambient light level exceeds the ambient light level threshold.

17. The system of claim of claim 13, wherein:

the comparison of the first image with the first image template results in an image-based authentication failure; and the user credentials authorize the user after the image-based authentication failure; and the system further comprises:

means for incrementing a failure count value in response to the image-based authentication failure;

means for determining whether the failure count value exceeds a failure count threshold value; and means for replacing the first image template with the second image template such that the first image template is no longer used for image-based authentication.

18. The method of claim 1, further comprising:

acquiring a third image with the computing device;

determining that the computing device is outside the threshold distance of the geographic location;

responsive to the determination that the computing device is outside the threshold distance, comparing the third image with the first image template to determine whether the user is authorized to use the computing device; and granting access to the computing device based on the comparison of the third image and the first image template.

19. The system of claim 7, wherein the system is further configured to:

acquire a third image with the computing device;

determine that the computing device is outside the threshold distance of the geographic location;

responsive to the determination that the computing device is outside the threshold distance, compare the third image with the first image template to determine whether the user is authorized to use the computing device; and grant access to the computing device based on the comparison of the third image and the first image template.

20. The system of claim 13, further comprising:

means for acquiring a third image with the computing device;

means for determining that the computing device is outside the threshold distance of the geographic location;

means for comparing the third image with the first image template to determine whether the user is authorized to use the computing device in response to the determination that the computing device is outside the threshold distance; and means for granting access to the computing device based on the comparison of the third image and the first image template.

\* \* \* \* \*